(12) United States Patent
Yokota et al.

(10) Patent No.: US 7,412,615 B2
(45) Date of Patent: Aug. 12, 2008

(54) INFORMATION PROCESSING EQUIPMENT AND POWER CONSUMPTION CONTROL METHOD

(75) Inventors: Junichi Yokota, Kanagawa (JP); Atsuo Okamoto, Kanagawa (JP); Keiji Kanota, Kanagawa (JP); Ryogo Ito, Tokyo (JP)

(73) Assignee: Sony Corporation (JP)

( * ) Notice: Subject to any disclaimer, the term of this patent is extended or adjusted under 35 U.S.C. 154(b) by 295 days.

(21) Appl. No.: 10/541,637

(22) PCT Filed: Dec. 25, 2003

(86) PCT No.: PCT/JP03/16789

§ 371 (c)(1),
(2), (4) Date: Jul. 7, 2005

(87) PCT Pub. No.: WO2004/070594

PCT Pub. Date: Aug. 19, 2004

(65) Prior Publication Data

US 2006/0123259 A1    Jun. 8, 2006

(30) Foreign Application Priority Data

Feb. 10, 2003    (JP) .............................. 2003-031866

(51) Int. Cl.
*G06F 1/26* (2006.01)
(52) U.S. Cl. ........................ 713/323; 713/300; 713/310; 713/320; 713/322; 713/324; 713/330; 713/340; 714/24; 369/47.36; 369/47.5
(58) Field of Classification Search ................ 713/300, 713/310, 320–324, 330, 340; 714/24; 369/47.36, 369/47.5
See application file for complete search history.

(56) References Cited

U.S. PATENT DOCUMENTS

| 5,361,364 | A | | 11/1994 | Nagashige et al. |
| 5,907,859 | A | * | 5/1999 | Shimada et al. .............. 711/112 |
| 6,353,894 | B1 | * | 3/2002 | Pione .......................... 713/340 |
| 6,553,501 | B1 | | 4/2003 | Yokoe |
| 6,590,730 | B2 | * | 7/2003 | Veltchev et al. ............... 360/69 |
| 6,622,252 | B1 | * | 9/2003 | Klaassen et al. ............ 713/320 |

(Continued)

FOREIGN PATENT DOCUMENTS

CA        2136701 A1    6/1995

(Continued)

*Primary Examiner*—Abdelmoniem Elamin
(74) *Attorney, Agent, or Firm*—Lerner, David, Littenberg, Krumholz & Mentlik, LLP

(57) ABSTRACT

Information processing equipment is so constructed that the power consumption of a disk drive for hard disks, optical disks, or the like can be reliably and sufficiently reduced. The host CPU (120) of an information processing unit (100) forms a command for changing the power consumption mode of a HDD (200) based on the state of control on the HDD (200). The host CPU supplies the command to the HDD (200) through a media controller (106). When the HDD (200) accepts the command, it changes its power consumption mode according to the instruction from the information processing unit. Thus, the information processing unit can control the power consumption mode of the HDD (200) based on the state of control on the HDD (200).

8 Claims, 20 Drawing Sheets

U.S. PATENT DOCUMENTS

| | | | |
|---|---|---|---|
| 6,725,385 B1 * | 4/2004 | Chu et al. | 713/320 |
| 6,734,802 B2 * | 5/2004 | Halleck et al. | 340/669 |
| 6,928,567 B2 * | 8/2005 | Nakai | 713/340 |

FOREIGN PATENT DOCUMENTS

| | | |
|---|---|---|
| JP | 04-192014 A | 7/1992 |
| JP | 06-105267 A | 4/1994 |
| JP | 07-200106 A | 8/1995 |
| JP | 09-006465 A | 1/1997 |
| JP | 09-128106 A | 5/1997 |
| JP | 09-270985 A | 10/1997 |
| JP | 2000-173152 A | 6/2000 |
| JP | 2000-227892 A | 8/2000 |
| JP | 2001-222346 A | 8/2001 |
| JP | 2001-222380 A | 8/2001 |
| JP | 2002-320221 A | 10/2002 |

\* cited by examiner

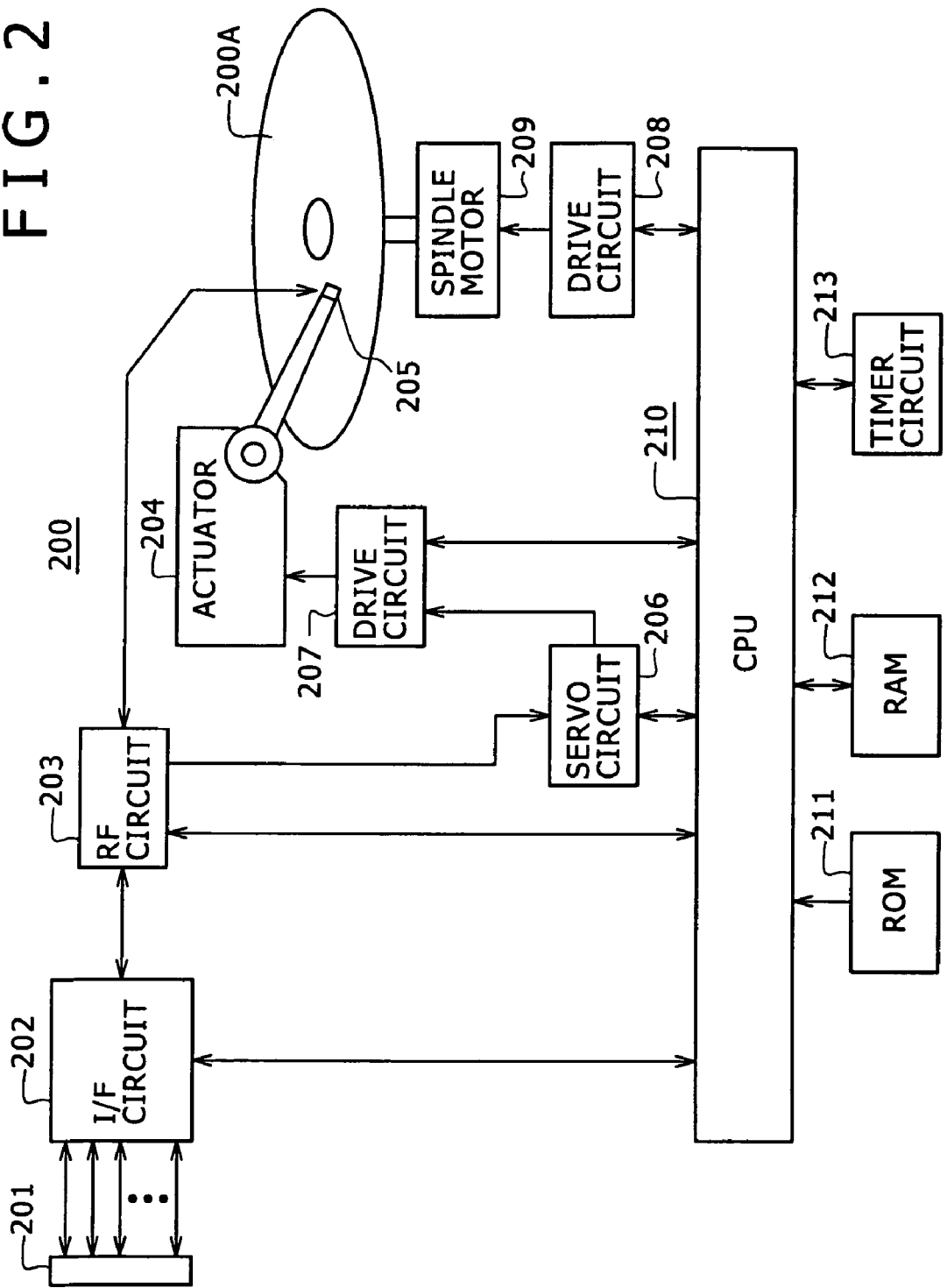

FIG. 3

POWER SAVE MODES OF INFORMATION STORAGE DEVICE (HDD)

| MODE | CIRCUIT PORTION / IF CIRCUIT | SPINDLE | ACTUATOR | SERVO CIRCUIT | RF CIRCUIT | EXAMPLE OF POWER CONSUMPTION |
|---|---|---|---|---|---|---|
| ACTIVE | Enable | Rotating | Load (ON DISK) | ON | Enable | READ 2.1W / WRITE 2.2W |
| LOW POWER ACTIVE (PERFORMANCE IDLE) | Enable | Rotating | Load (ON DISK) | ON | Disable | 1.85W |
| ACTIVE IDLE | Enable | Rotating | Load (ON DISK) | OFF | Disable | 0.95W |
| LOW POWER IDLE | Enable | Rotating | Parking (OUT OF DISK) | OFF | Disable | 0.65W |
| STANDBY | Enable | Stop | Parking (OUT OF DISK) | OFF | Disable | 0.25W |
| SLEEP | Lowest | Stop | Parking (OUT OF DISK) | OFF | Disable | 0.10W |

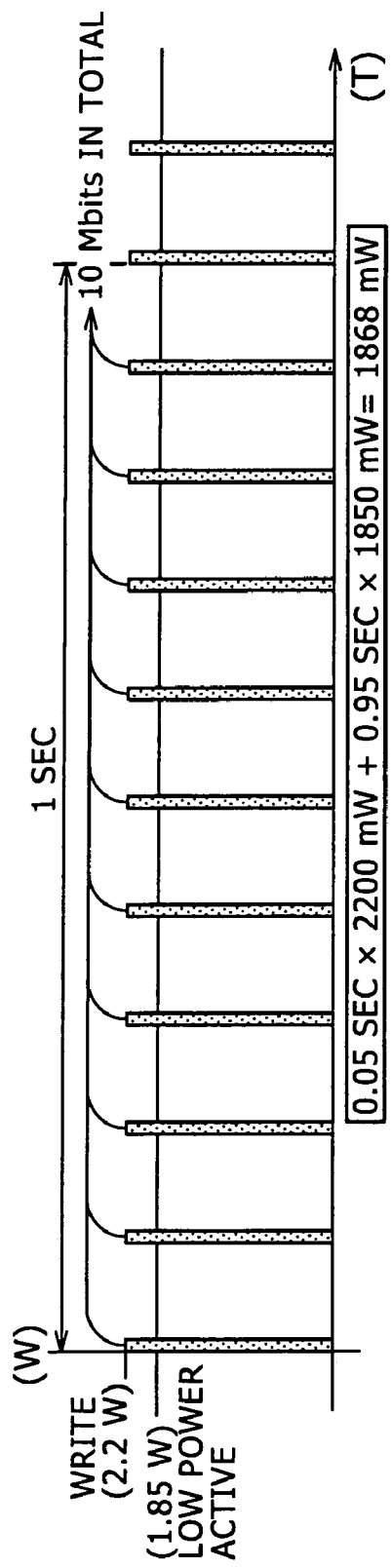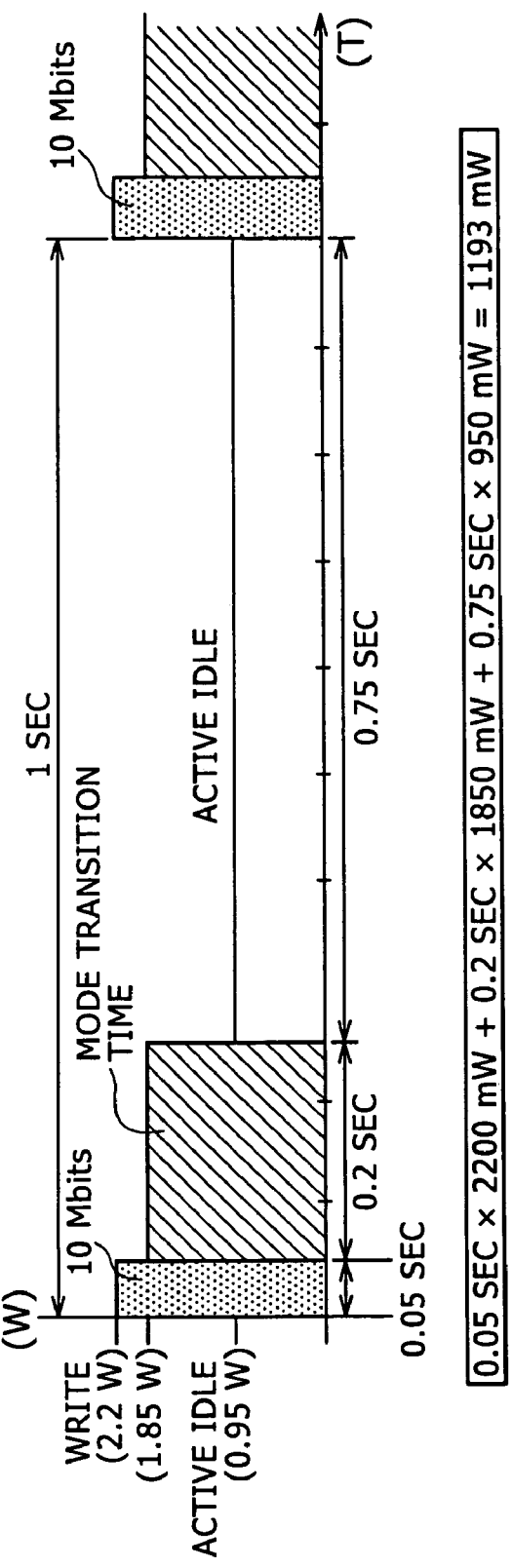
FIG. 4A
FIG. 4B

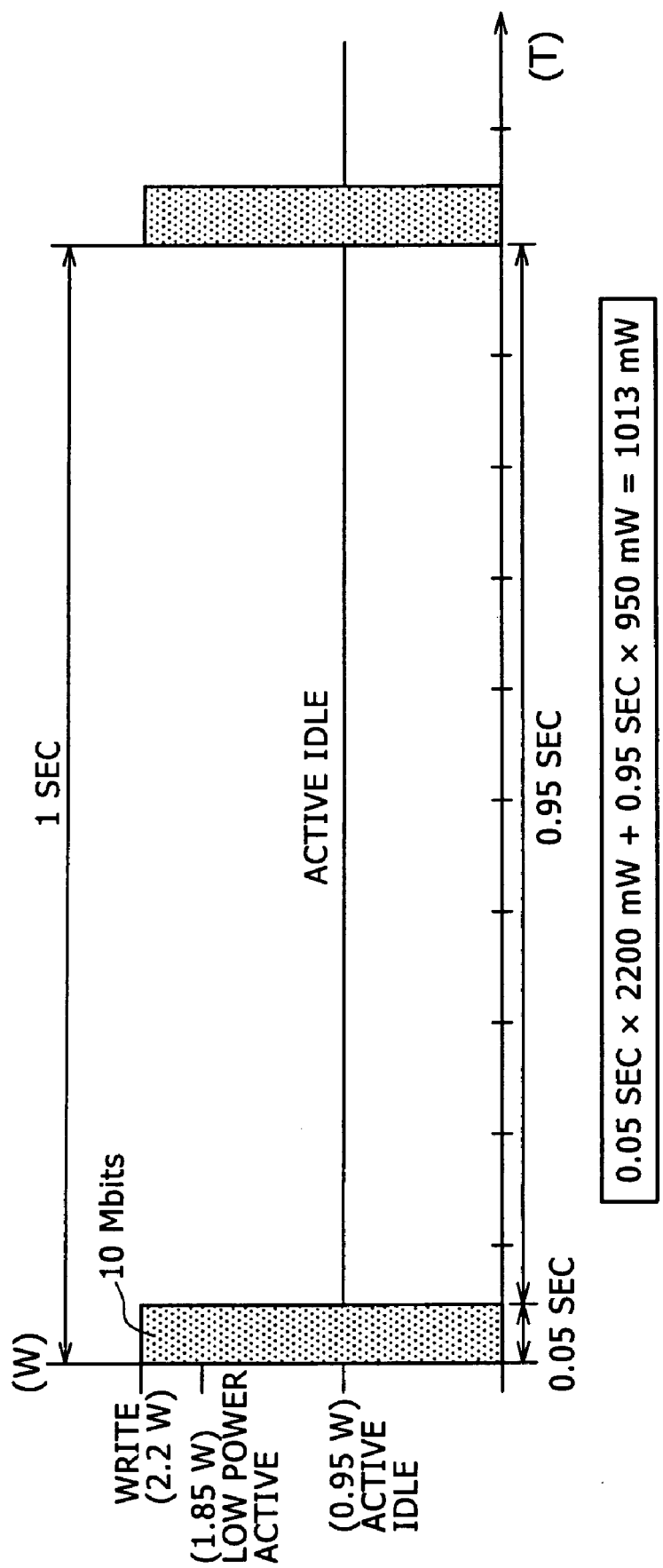

FIG. 6

COMMAND CODE: EFh

| REGISTERS | 7 | 6 | 5 | 4 | 3 | 2 | 1 | 0 |
|---|---|---|---|---|---|---|---|---|
| FEATURES | SUBCOMMAND CODE | | | | | | | |
| SECTOR COUNT | SUBCOMMAND SPECIFIC | | | | | | | |
| SECTOR NUMBER | SUBCOMMAND SPECIFIC | | | | | | | |
| CYLINDER LOW | SUBCOMMAND SPECIFIC | | | | | | | |
| CYLINDER HIGH | SUBCOMMAND SPECIFIC | | | | | | | |
| DEVICE/HEAD | obs | na | obs | DEV | na | na | na | na |
| COMMAND | EFh | | | | | | | | obs : obsolete     na : not applicable

FIG. 7

| VALUE | DESCRIPTION |
|---|---|
| 01h | Enable 8-bit PIO transfer mode |
| 02h | Enable write cache |
| 03h | Set transfer mode based on value in Sector Count register |
| 04h | Obsolete |
| 05h | Enable Advanced Power Management |
| ⋮ | ⋮ |
| * 25h | Enable Direct Power Management |
| * 26h | Set Host Controlled Advanced Power Management |
| ⋮ | ⋮ |
| 85h | Disable Advanced Power Management |
| ⋮ | ⋮ |
| * A5h | Disable Direct Power Management |
| ⋮ | ⋮ |

SET FEATURES COMMAND

FIG. 8A

| REGISTERS | 7 | 6 | 5 | 4 | 3 | 2 | 1 | 0 | |
|---|---|---|---|---|---|---|---|---|---|
| FEATURES | 0 | 0 | 1 | 0 | 0 | 1 | 0 | 1 | (25h) |
| DEVICE/HEAD | 1 | 0 | 1 | 0 | 0 | 0 | 0 | 0 | (A0h) |
| COMMAND | 1 | 1 | 1 | 0 | 1 | 1 | 1 | 1 | (EFh) |

FIG. 8B

| REGISTERS | 7 | 6 | 5 | 4 | 3 | 2 | 1 | 0 | |
|---|---|---|---|---|---|---|---|---|---|
| FEATURES | 1 | 0 | 1 | 0 | 0 | 1 | 0 | 1 | (A5h) |
| DEVICE/HEAD | 1 | 0 | 1 | 0 | 0 | 0 | 0 | 0 | (A0h) |
| COMMAND | 1 | 1 | 1 | 0 | 1 | 1 | 1 | 1 | (EFh) |

FIG.9

COMMAND CODE: EFh

| REGISTERS | 7 | 6 | 5 | 4 | 3 | 2 | 1 | 0 |
|---|---|---|---|---|---|---|---|---|
| FEATURES | na |||||||||
| SECTOR COUNT | na |||||||||
| SECTOR NUMBER | na |||||||||
| CYLINDER LOW | na |||||||||
| CYLINDER HIGH | na |||||||||
| DEVICE/HEAD | obs | na | obs | DEV | na | na | na | na |
| COMMAND | E1h ||||||||| obs : obsolete    na : not applicable

F I G . 1 0

| VALUE | DESCRIPTION |
|---|---|
| 00h | Active Immediate |
| 01h | Low Power Active Immediate |
| 02h | Active Idle Immediate |
| 03h | Low Power Idle Immediate |

IDLE IMMEDIATE COMMAND

FIG.11A

| REGISTERS | 7 | 6 | 5 | 4 | 3 | 2 | 1 | 0 | |
|---|---|---|---|---|---|---|---|---|---|
| FEATURES | 0 | 0 | 0 | 0 | 0 | 0 | 0 | 0 | (00h) |
| DEVICE/HEAD | 1 | 0 | 1 | 0 | 0 | 0 | 0 | 0 | (A0h) |
| COMMAND | 1 | 1 | 1 | 0 | 0 | 0 | 0 | 1 | (E1h) |

FIG.11B

| REGISTERS | 7 | 6 | 5 | 4 | 3 | 2 | 1 | 0 | |
|---|---|---|---|---|---|---|---|---|---|
| FEATURES | 0 | 0 | 0 | 0 | 0 | 0 | 0 | 1 | (01h) |
| DEVICE/HEAD | 1 | 0 | 1 | 0 | 0 | 0 | 0 | 0 | (A0h) |
| COMMAND | 1 | 1 | 1 | 0 | 0 | 0 | 0 | 1 | (E1h) |

FIG.11C

| REGISTERS | 7 | 6 | 5 | 4 | 3 | 2 | 1 | 0 | |
|---|---|---|---|---|---|---|---|---|---|
| FEATURES | 0 | 0 | 0 | 0 | 0 | 0 | 1 | 0 | (02h) |
| DEVICE/HEAD | 1 | 0 | 1 | 0 | 0 | 0 | 0 | 0 | (A0h) |
| COMMAND | 1 | 1 | 1 | 0 | 0 | 0 | 0 | 1 | (E1h) |

FIG.11D

| REGISTERS | 7 | 6 | 5 | 4 | 3 | 2 | 1 | 0 | |
|---|---|---|---|---|---|---|---|---|---|
| FEATURES | 0 | 0 | 0 | 0 | 0 | 0 | 1 | 1 | (03h) |
| DEVICE/HEAD | 1 | 0 | 1 | 0 | 0 | 0 | 0 | 0 | (A0h) |
| COMMAND | 1 | 1 | 1 | 0 | 0 | 0 | 0 | 1 | (E1h) |

FIG.12A

COMMAND CODE: E5h

| REGISTERS | 7 | 6 | 5 | 4 | 3 | 2 | 1 | 0 |
|---|---|---|---|---|---|---|---|---|
| FEATURES | na ||||||||
| SECTOR COUNT | na ||||||||
| SECTOR NUMBER | na ||||||||
| CYLINDER LOW | na ||||||||
| CYLINDER HIGH | na ||||||||
| DEVICE/HEAD | obs | na | obs | DEV | na | na | na | na |
| COMMAND | E5h |||||||| obs : obsolete    na : not applicable

FIG.12B

| REGISTERS | 7 | 6 | 5 | 4 | 3 | 2 | 1 | 0 |
|---|---|---|---|---|---|---|---|---|
| ERROR | na ||||||||
| SECTOR COUNT | Result Value ||||||||
| SECTOR NUMBER | na ||||||||
| CYLINDER LOW | na ||||||||
| CYLINDER HIGH | na ||||||||
| DEVICE/HEAD | obs | na | obs | DEV | na | na | na | na |
| STATUS | BSY | DRDY | DF | na | DRQ | na | na | ERR | obs : obsolete    na : not applicable

FIG.13A

| VALUE | DESCRIPTION |
|---|---|
| 00h | STANDBY MODE |
| 80h | IDLE MODE |
| FFh | ACTIVE MODE OR IDLE MODE |

FIG.13B

| VALUE | DESCRIPTION |
|---|---|
| FFh | ACTIVE MODE |
| 83h | LOW POWER ACTIVE MODE |
| 82h | ACTIVE IDLE MODE |
| 81h | LOW POWER IDLE MODE |
| 00h | STANDBY MODE |

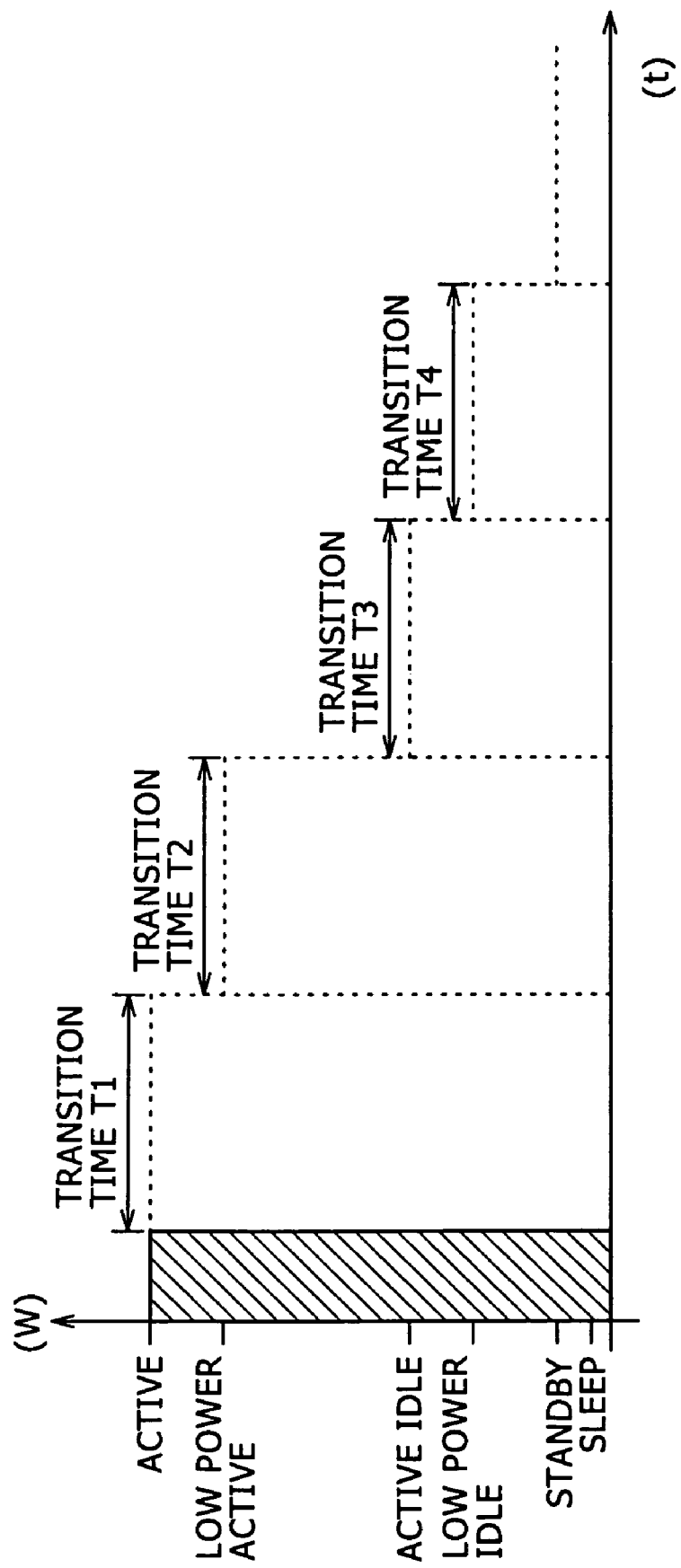

FIG. 15

COMMAND CODE: Efh

| REGISTERS | 7 | 6 | 5 | 4 | 3 | 2 | 1 | 0 |
|---|---|---|---|---|---|---|---|---|
| FEATURES | 26h ||||||||
| SECTOR COUNT | (00h ~ 03h) ||||||||
| SECTOR NUMBER | (00h ~ FFh) ||||||||
| CYLINDER LOW | na ||||||||
| CYLINDER HIGH | na ||||||||
| DEVICE/HEAD | obs | na | obs | DEV | na | na | na | na |
| COMMAND | Efh |||||||| obs : obsolete      na : not applicable

FIG. 16

| VALUE | DESCRIPTION |
|---|---|
| 00h | SPECIFY TRANSITION TIME FROM ACTIVE TO LOW POWER ACTIVE |
| 01h | SPECIFY TRANSITION TIME FROM LOW POWER ACTIVE TO ACTIVE IDLE |
| 02h | SPECIFY TRANSITION TIME FROM ACTIVE IDLE TO LOWER POWER IDLE |
| 03h | SPECIFY TRANSITION TIME FROM LOWER POWER IDLE TO STANDBY |

FIG.17

$$\text{VALUE IN SECTOR NUMBER REGISTER} \times 40 \text{ msec} = \text{SET TIME} \quad \cdots (1)$$

FIG. 18

LIST OF POWER CONSUMPTION CONTROL FUNCTIONS

| SETTING | | | OPERATION | | | |
|---|---|---|---|---|---|---|
| SETTING OF DIRECT POWER MANAGEMENT | SETTING OF STANDBY TIMER | SETTING OF ADVANCED POWER MANAGEMENT FOR PC | STANDBY TIMER | ADVANCED POWER MANAGEMENT FOR PC | HOST CONTROLLED ADVANCED POWER MANAGEMENT | DIRECT POWER MANAGEMENT |
| DISABLED (DEFAULT) | DISABLED (DEFAULT) | ENABLED (DEFAULT) | × DISABLED | ○ ENABLED APM Mode 0 | × DISABLED | × DISABLED |
| DISABLED (DEFAULT) | DISABLED (DEFAULT) | DISABLED | × DISABLED | ○ ENABLED APM Mode 0 | × DISABLED | × DISABLED |
| DISABLED (DEFAULT) | ENABLED | ENABLED (DEFAULT) | ○ ENABLED | × DISABLED | × DISABLED | × DISABLED |
| DISABLED (DEFAULT) | ENABLED | DISABLED | ○ ENABLED | × DISABLED | × DISABLED | × DISABLED |
| ENABLED | DISABLED (DEFAULT) | ENABLED (DEFAULT) | × DISABLED | × DISABLED | ○ ENABLED | ○ ENABLED |
| ENABLED | DISABLED (DEFAULT) | DISABLED | × DISABLED | × DISABLED | ○ ENABLED | ○ ENABLED |
| ENABLED | ENABLED | ENABLED (DEFAULT) | ○ ENABLED | × DISABLED | ○ ENABLED | ○ ENABLED |
| ENABLED | ENABLED | DISABLED | ○ ENABLED | × DISABLED | ○ ENABLED | ○ ENABLED |

INFORMATION PROCESSING EQUIPMENT AND POWER CONSUMPTION CONTROL METHOD

TECHNICAL FIELD

The present invention relates to information processing equipment that uses a hard disk, an optical disk, or the like, for example, as a recording medium and a power consumption control method therefor.

BACKGROUND ART

Disk units, such as hard disk drives and DVD drives (Digital Versatile Disk drives), are used for auxiliary information storage devices for personal computers, for example. These disk units have a plurality of power consumption modes and are so constructed that the power consumption mode is changed and controlled on the disk unit side and reduction of power consumption is thereby accomplished.

More specific description will be given. In hard disk drives (hereafter, abbreviated to "HDD") connected with a personal computer through the AT Attachment (hereafter, abbreviated to "ATA") interface, for example, power consumption control (power save control) is carried out through the functions described below: Standby Timer function, Advanced Power Management (hereafter, abbreviated to "APM") function, or the like.

In this case, a plurality of power consumption modes are provided as changeable power consumption modes. Such power consumption modes include, for example, Active mode, Idle mode that is divided into a plurality of stages, Standby mode, and Sleep mode in descending order of power consumption.

The Standby Timer function is for performing the following operation: a time-out value preset by a host device is taken as the initial value; when there is no access from the host device in so-called Idle mode, counting down is started for the time-out value; when the count is zeroed, the mode automatically shifts to Standby mode.

The APM function is for performing the following operation: the HDD itself estimates the pattern of access from the host device to the HDD based on historical information about accessing from the host device; the power consumption mode is changed based on the result of this estimation. In this case, the time taken until the power consumption mode is changed (transition time) is adaptively varied based on the pattern of access from the host device to the HDD.

Various techniques have been disclosed with respect to such power consumption control. For example, Japanese Unexamined Patent Publication No. Hei 9(1997)-6465 discloses the following technique: information processing equipment is provided with a power saving timer, and the value on this power saving timer is adaptively varied. Thus, the power consumption is efficiently reduced without degrading the processing efficiency of the information processing equipment.

More specific description will be given. In the technique described in Japanese Unexamined Patent Publication No. Hei 9(1997)-6465, the following operation is performed: in information processing equipment provided with a power saving timer, the mode is caused to transition to power saving mode when a time set on the power saving timer has passed after the last processing operation. When a task resumption request comes relatively soon after power saving mode is established in this case, the power saving timer is set to a slightly larger value for the next and following operations. Thus, the mode is prevented from unnecessarily transitioning to power saving mode.

If the time from when power saving mode is established to when a task resumption request is made is long, the power saving timer is set to a slightly smaller value for the next and following operations. Thus, the mode is caused to transition to power saving mode as quickly as possible. As mentioned above, Japanese Unexamined Patent Publication No. Hei 9(1997)-6465 describes a technique for estimating the subsequent access patterns from access history and changing the mode as in the above-mentioned APM function of HDDs.

However, the above-mentioned APM function of HDDs and the technique described in Japanese Unexamined Patent Publication No. Hei 9(1997)-6465 have their limit on the accuracy of estimation. This is because, in these function and technique, access patterns are estimated based on the history of access to the device itself that estimates access patterns. For this reason, it is suspected that there are cases where the mode may be caused to transition to a mode with low power consumption; nevertheless, the equipment stands by in high-power consumption mode, such as Active mode, in which much power is consumed.

It is suspected that there are converse cases where it is likely that access immediately takes place; nevertheless, the mode transitions from Active mode, in which operation can be immediately started, to Idle mode or Standby mode, which takes longer time to start as compared with Active mode.

In these cases, wasteful power consumption occurs, and further loss can be produced in processing time by an amount equivalent to the time it takes to transition from Idle mode or Standby mode to Active mode.

Recently, consideration has been given to utilization of hard disk or DVD as a recording medium for so-called mobile devices, such as digital video cameras, which are carried about when used. That is, consideration has been given to mounting a HDD or DVD drive in the enclosure of a mobile device, such as a digital video camera.

In case of mobile device, a battery is used as the power source, and the following requirements must be sufficiently met: lengthening the battery duration, suppressing temperature rise in the enclosure of the mobile device, and the like. However, a problem arises when a HDD or a DVD drive is mounted in a mobile device. These drives are higher in power consumption and produces more heat as compared with the other devices and components mounted in the same enclosure. For this reason, it is desirable that the power consumption should be reliably and sufficiently reduced with respect to various drives, such as HDDs and DVD drives.

The present invention has been made in light of the foregoing. An object of the present invention is to provide an apparatus and a method wherein the power consumption of a disk drive for hard disk and optical disk, for example, can be reliably and sufficiently reduced.

DISCLOSURE OF THE INVENTION

In order to solve the above problem, information processing equipment according to the present invention comprises:
the information processing equipment comprises:
an information storing means that records or reproduces data according to a plurality of power consumption modes; and an information processing means that controls the information storing means with respect to at least recording or reproduction of the data, in which
the information processing means forms command information for changing the power consumption mode of the information storing means to an intended power consumption mode based on control state, and the information storing means changes the power consumption mode of the information storing means according to the command information.

In this information processing equipment of the present invention, the information processing means forms command information for changing the power consumption mode of the information storing means according to the state of control on the information storing means. In the information storing means, its own power consumption mode is changed according to the command information formed in the information processing means.

Conventionally, in a single information storage device, such as a hard disk drive, the power consumption mode is changed by the information storage device itself. According to the present invention, the power consumption mode can be changed according to command information from the information processing means. More specific description will be given. The information processing means always precisely grasps how the information storing means should be accessed. For this reason, the information processing means can implement most proper power consumption control based on the state of control on the information storing means.

BRIEF DESCRIPTION OF DRAWINGS

FIG. 2 is a block diagram explaining an example of the constitution of the HDD illustrated in FIG. 1.

FIG. 3 is a drawing explaining the power consumption modes of the HDD illustrated in FIG. 2.

FIG. 4A and FIG. 4B are drawings explaining normal access and conventional intermittent access.

FIG. 5 is a drawing explaining intermittent access made in the recording and reproducing device illustrated in FIG. 1.

FIG. 6 is a drawing explaining the Set Features command.

FIG. 7 is a drawing explaining the values settable on the Features register under the Set Features command and the meaning of them.

FIG. 8A and FIG. 8B are drawings explaining an concrete example of the Set Features command for controlling enabling/disabling of the DPM function.

FIG. 9 is a drawing explaining the Idle Immediate command.

FIG. 10 is a drawing explaining the values settable on the Feature register under the Idle Immediate command and the meaning of them.

FIG. 11A to FIG. 11D are drawings explaining a concrete example of the Idle Immediate command.

FIG. 12A and FIG. 12B are drawings explaining the Check Power Mode command.

FIG. 13A and FIG. 13B are drawings explaining the values the Sector Count register under the Check Power Mode command can take and the meaning of them.

FIG. 14 is a drawing explaining the HCAPM function.

FIG. 15 is a drawing explaining the Set Features command utilized to use the HCAPM function.

FIG. 16 is a drawing explaining the Set Features command utilized to use the HCAPM function.

FIG. 17 is a drawing explaining the Set Features command utilized to use the HCAPM function.

FIG. 18 is a drawing explaining the power consumption control function of the recording and reproducing device illustrated in FIG. 1.

BEST MODE FOR CARRYING OUT THE INVENTION

Hereafter, description will be given to an embodiment of the present invention with reference to drawings. The embodiment will be described below, taking as an example a case where the apparatus and method according to the present invention are applied to the following item: a digital video camera that is a recording and reproducing device provided with camera functions and incorporating a HDD (Hard Disk Drive) for using a hard disk as a recording medium.

[Recording and Reproducing Device]

Figure 1:
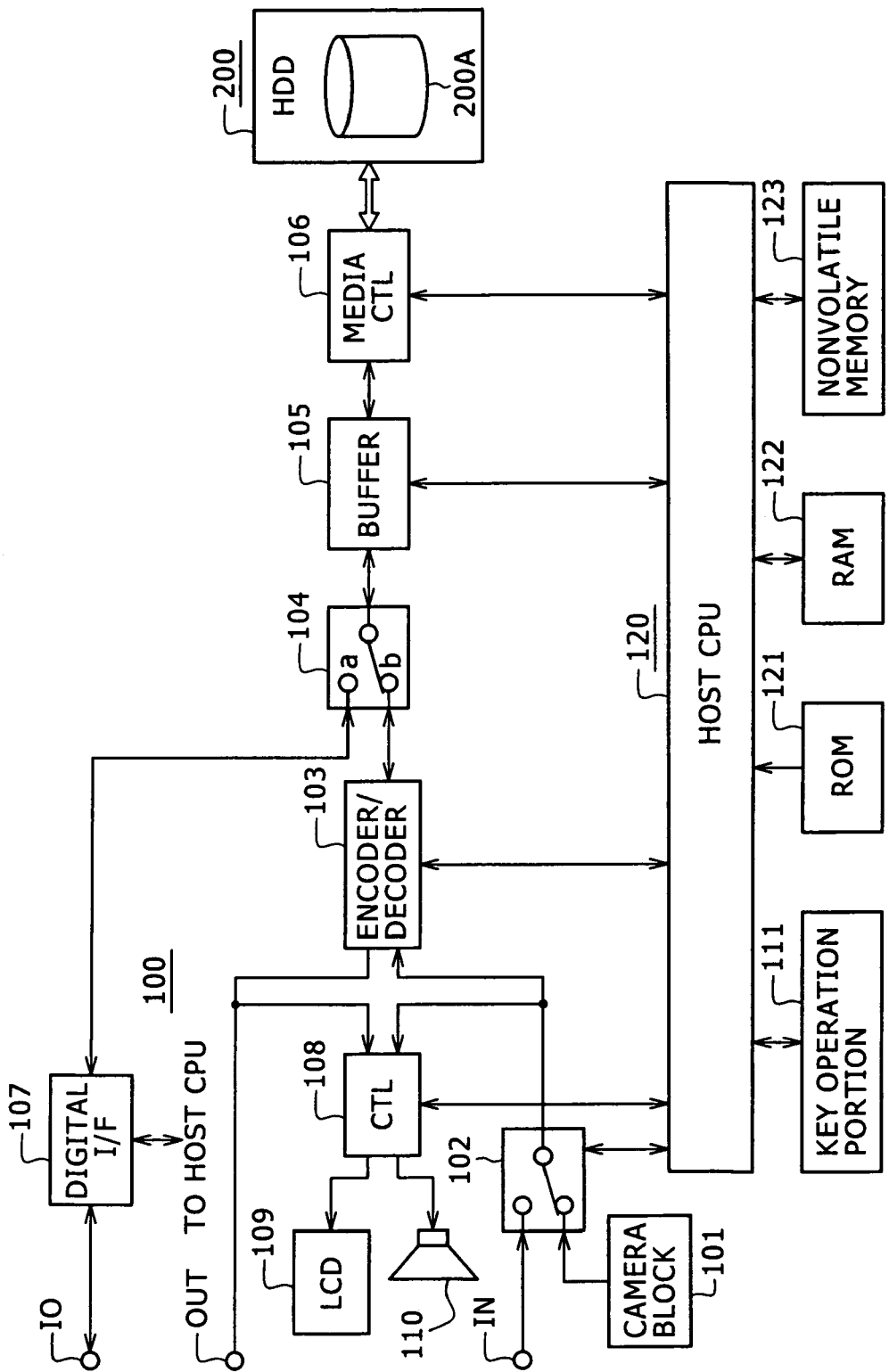
FIG. 1 is a block diagram explaining a recording and reproducing device to which the present invention is applied.

FIG. 1 is a block diagram for explaining a recording and reproducing device in this embodiment. As illustrated in FIG. 1, the recording and reproducing device in this embodiment is roughly composed of an information processing unit (information processing means) 100 and an information storing unit (information storing means) 200, each provided with a CPU. The information storing unit 200 is a HDD incorporated in the recording and reproducing device in this embodiment. In the following description, the recording and reproducing device will be divided into the information processing unit 100 and the information storing unit, or the HDD 200. Description will be given to the constitution and operation of each component.

[Information Processing Unit 100]

First, description will be given to the information processing unit 100 of the recording and reproducing device in this embodiment. As illustrated in FIG. 1, the information processing unit 100 of the recording and reproducing device in this embodiment is provided with the following items as input and output ends for information: digital input/output terminal io, digital output terminal out, digital input terminal in, and camera block 101.

As illustrated in FIG. 1, the information processing unit is also provided with a signal processing system, a monitor output system, and a host CPU (Central Processing Unit) 120. The signal processing system comprises two switch circuits 102 and 104, an encoder/decoder 103, a buffer memory circuit 105, and a media controller 106. The monitor output system comprises a controller 108 for output, an LCD (Liquid Crystal Display) 109, and a speaker 110. The host CPU controls each part.

As illustrated in FIG. 1, the host CPU 120 is connected with a ROM (Read Only Memory) 121, a RAM (Random Access Memory) 122, a nonvolatile memory 123, such as EEPROM (Electrically Erasable and Programmable ROM), and is further connected with a key operation portion 111.

The key operation portion 111 is for accepting instruction input from a user, and is provided with function keys, including an operation mode change-over key, playback key, stop key, fast forward key, fast reverse key, pause key, and the like, other various adjusting keys, and the like.

The operation modes of the recording and reproducing device in this embodiment include, for example, shooting mode and normal mode. The shooting mode is a mode in which images are picked up through the camera block 101, and the pictures and sounds picked up are recorded on the hard disk 200A in the HDD 200.

The normal mode is a mode in which operations other than those in shooting mode can be performed. In this mode, the following operations are performed: information signals recorded on the hard disk 200A in the HDD 200 are read and reproduced; and information signals supplied through the digital input/output terminal io or the digital output terminal out are recorded on the hard disk 200A in the HDD 200.

The recording and reproducing device in this embodiment can be brought into so-called function disabled state by predetermined key operation. In this state, the recording function and reproducing function of the recording and reproducing device in this embodiment are disabled to prevent power from being consumed.

The ROM 121 connected with the host CPU 120 is for storing various programs executed at the host CPU 120 and data required for processing, and the RAM 122 is used mainly as a work area. The nonvolatile memory 123 is for storing varied setting information and parameters that must be held even after the power supply is turned off.

The host CPU 120 performs the operation described below. In response to a request from a user inputted through the key operation portion 111, it carries out the following controls: control of encoding and decoding of audio/visual data (hereafter, referred to as "AV data") consisting of audio data and visual data, buffer control, media controller control, switch control, and the like. Thus, the host CPU makes it possible to record AV data and the like, supplied to this recording and reproducing device, on the hard disk 200A in HDD 200, and read and reproduce the AV data recorded on the hard disk 200A in the HDD 200.

[Operation of Information Processing Unit 100]

Description will be given to the flow of information signals that takes place in the information processing unit 100 of the recording and reproducing device in this embodiment when the signals are recorded and reproduced. First, description will be given to the flow of information signals that takes place when they are recorded.

[Flow of Information Signal (Data) when Recorded]

The recording and reproducing device in this embodiment is so constructed that, when shooting mode is established through the key operation portion 111, pictures and sounds picked up through the camera block 101 can be accepted and recorded on the hard disk 200A in the HDD 200.

Further, the recording and reproducing device is so constructed that, when normal mode is established through the key operation portion 111 and an external digital device, such as a personal computer, is connected with the digital input/output terminal io, the following takes place: the recording and reproducing device inputs and outputs data through the digital input/output terminal io. Thus, the recording and reproducing device can be used as an auxiliary information storage device for an external digital device connected therewith. The digital input/output terminal io complies with the USB (Universal Serial Bus) 2.0 standard.

Further, the recording and reproducing device is so constructed that, when no external digital device is connected with the digital input/output terminal io in normal mode, data can be accepted through the digital input terminal in and outputted through the digital output terminal out.

First, specific description will be given to the flow of signals that takes place in the following case: shooting mode is established according to an instruction from a user, accepted through the key operation portion 111; and visual data and audio data from the camera block 101 are recorded.

When shooting mode is selected, the settings of the switch circuit 102 and the switch circuit 104 are changed to the input end b side under the control of the host CPU 120, as illustrated in FIG. 1. In the case of this example, further, the host CPU 120 accesses the hard disk 200A in the HDD 200 at a logical address through the media controller 106, and acquires required information, such as management information, formed on the hard disk 200A. The host CPU 120 obtains required information from the acquired management information and the like, and makes preparations for recording and grasps free cluster positions.

The camera block 101 comprises a lens, a CCD (Charge Coupled Device), a microphone, and the like, which are not shown in the figure. The camera block can convert the image of a subject coming through the lens into visual signals through the CCD, and convert them into digital visual signals. Also, the camera block can collect sounds through the microphone, and convert them into electrical signals. Further, it can convert them into digital audio signals, and output AV data consisting of these digital signals to the subsequent circuit.

The AV data outputted from the camera block 101 is supplied to the encoder/decoder 103 through the switch circuit 102. The encoder/decoder 103 compresses (encodes) the supplied AV data by a predetermined encoding scheme, for example, the MPEG (Moving Picture Experts Group) scheme. It supplies the encoded AV data to the buffer memory circuit (hereafter, simply referred to as "buffer") 105 through the switch circuit 104.

Writing and reading data to and from the buffer 105 are controlled by the host CPU 120. Therefore, the AV data from the switch circuit 104 is written to the buffer 105 under the control of the host CPU 120, and at the same time, the AV data already written to the buffer 105 is read out. That is, in the recording and reproducing device in this embodiment, the time base is corrected with respect to AV data using the buffer 105 between the recording and reproducing device and the hard disk 200A as a recording medium that are asynchronous with each other.

As mentioned above, when the contents data (information signals) to be recorded is real-time data, such as AV data, consisting of moving image information and audio information, such a scheme that, while the contents data is written to the buffer 105, it is read out is adopted. The AV data is used by so-called FIFO (First In First Out).

The camera block 101 is capable of not only picking up moving images, but also picking up the still-frame image of a subject in response to an instruction from the user. In case of recording a freeze-frame picture, contents data is all stored in the buffer 105 or the RAM 122 or the like connected with the host CPU 120, and then written onto the hard disk 200A. Therefore, to record a freeze-frame picture, real-time processing is unnecessary unlike recording of moving images.

The AV data read from the buffer 105 under the read control of the host CPU 120 is supplied to the HDD 200 through the media controller 106. Then, it is written in sequence into free spaces on the hard disk 200A in the HDD 200 based on the previously grasped positions of free clusters.

During recording of information signals, file management information on the hard disk is periodically updated by the host CPU 120 through the media controller 106. When recording of AV data is completed as well, file management information and directory entry information are updated by the host CPU 120 through the media controller 106.

Thus, AV data consisting of moving images and sounds captured through the camera block 101 is recorded in free clusters on the hard disk 200A in HDD 200.

Next, description will be given to cases where information signals, such as AV data, supplied through the digital input terminal in are recorded. As also mentioned above, if an external digital device is connected with the digital input/ output terminal io in normal mode, the setting of the switch circuit 102 is changed to the input end a side under the control of the host CPU 120. Then, input of information signals through the digital input terminal in is accepted. The digital input terminal in is capable of accepting not only supply of moving image information but also that of still-frame image information and the like.

With respect to information signals supplied through the digital input terminal in, the same operation as in the above-mentioned case where AV signals from the camera block 101 are recorded on the hard disk 200A is performed. That is, information signals supplied through the digital input terminal in are recorded on the hard disk 200A in the HDD 200 through the encoder/decoder 103, switch circuit 104, buffer 105, and media controller 106.

When an external digital device, such as a personal computer, is connected with the digital input/output terminal io through a USB cable in normal mode, the setting of the switch circuit 102 is changed to the input end a side under the control of the host CPU 120.

Varied digital data supplied through the digital input/output terminal io need not be encoded. Therefore, it is supplied to the buffer 105 through the switch circuit 104. Subsequently, it is recorded on the hard disk 200A in the HDD 200 as in the above-mentioned recording of information signals, such as AV data, from the camera block 101 or the digital input terminal in.

As also mentioned above, the recording and reproducing device in this embodiment is so constructed that, when an external digital device is connected with the digital input/output terminal io, it can operate as follows: it is used as an ordinary external information storage device for the external digital device; and it records data, such as AV data, on the hard disk 200A in the HDD 200 in response to a request from the external digital device connected with the digital input/output terminal io.

When AV data from the camera block 101 is recorded (in shooting) and when AV data supplied through the digital input terminal in is recorded, the supplied AV data is supplied to the controller 108 for monitor output. The controller 108 separates the supplied AV data into visual data and audio data to from visual signals to be supplied to the LCD 109 and audio signals to be supplied to the speaker 110. The formed visual signals and audio signals are supplied to the LCD 109 and the speaker 110. Thus, the pictures and sounds being recorded on the hard disk 200A can be monitored through the LCD 109 and the speaker 110.

[Flow of Information Signal (Data) when Reproduced]

Next, description will be given to the flow of information signals that takes place when they are reproduced. When reproduction instructing input from the user is accepted through the key operation portion 111 in normal processing mode, the host CPU 120 accesses the hard disk 200A in the HDD 200 at a logical address through the media controller 106. Then, it acquires required information formed on the hard disk 200A, including management information, file system information such as FAT (File Allocation Table) information, directory entry information, and the like.

Then, the host CPU 120 displays a list on the LCD 109 through the host CPU 120 and the controller 108 or performs like operation based on the acquired information, such as directory entry information. The list contains files that are recorded on the hard disk 200A and can be reproduced. Thus, the host CPU accepts input selecting a file to be reproduced.

When the host CPU 120 accepts input selecting a file to be reproduced, through the key operation portion 111, it grasps the position on the hard disk 200A where the file to be reproduced is recorded, from the acquired directory entry and file system information.

When an external digital device is connected with the digital input/output terminal io in normal mode in this embodiment, as also mentioned above, the setting of the switch circuit 104 is changed to the terminal a side. When no external digital device is connected with the digital input/output terminal io, the setting of the switch circuit 104 is changed to the terminal b side. Needless to add, such a constitution that the user selects either the digital input/output terminal io or the digital output terminal in may be adopted.

Thereafter, the host CPU 120 controls the media controller 106 and reads information signals from the target file stored on the hard disk 200A in the HDD 200. It writes the information signals, which are read out, to the buffer 105 through the media controller 106.

As also mentioned above, reading and writing data from and to the buffer 105 are controlled by the host CPU 120. Data read from the hard disk 200A is written, and data already written to the buffer 105 is read out. In reproduction as well as recording, the time base is corrected with respect to the information signals to be reproduced, using this buffer 105.

The information signals read from the buffer 105 are supplied to the digital input/output terminal io or the encoder/decoder 103 through the switch circuit 104. That is, with the setting of the switch circuit 104 changed to the terminal a side, the information signals read from the hard disk 200A are supplied through the digital input/output terminal io to an external digital device, such as a personal computer, connected therewith.

With the setting of the switch circuit 104 changed to the terminal b side, the information signals read from the buffer 105 are supplied to the encoder/decoder 103 through the switch circuit 104. They are decoded there, and AV data or still-frame image information restored to its original state before encoding is outputted through the digital output terminal out.

In this case, as also mentioned above, the AV data decoded at the encoder/decoder 103 is also outputted to the controller 108 for monitor output. The AV data is separated there into visual data and audio data to form visual signals to be supplied to the LCD 109 and audio signals to be supplied to the speaker 110. The formed visual signals and audio signals are supplied to the LCD 109 and the speaker 110.

Thus, a picture corresponding to visual data outputted through the digital output terminal out is displayed on the LCD 109; a sound corresponding to audio data outputted through the digital output terminal out comes out of the speaker 110. Thus, pictures and sounds respectively corresponding to visual data and audio data; outputted through the digital output terminal out, can be monitored.

Thus, the recording and reproducing device in this embodiment can be supplied with moving image information and the like, record them on the hard disk 200A in the HDD 200, and read and reproduce information signals recorded on the hard disk 200A in the HDD 200.

[Information Storing Unit (HDD) 200]

Next, description will be given to the HDD 200, or the information storing unit of the recording and reproducing device in this embodiment. As illustrated in FIG. 2, the HDD 200 comprises a connection end 201, interface circuit (hereafter, referred to as "I/F circuit") 202, RF circuit 203, actuator 204, magnetic head 205, servo circuit 206, drive circuit 207 for actuator, drive circuit 208 for spindle, spindle motor 209, and CPU 210.

The CPU 210 is connected with a ROM 211, RAM 212, and timer circuit 213. The ROM 211 is for recording various programs executed at the CPU 210 and data required for processing. The RAM 212 is used mainly as a work area.

The timer circuit 213 is so constructed that it can count times set from the information processing unit 100 and form triggers for changing the power consumption mode. These operations are intended to implement, for example, the above-mentioned Standby Timer function and the HCAPM function described in detail later.

The hard disk 200A is rotationally driven by the spindle motor 209 that is rotated at a constant speed according to drive signals from the drive circuit 208 under the control of the CPU 210.

The actuator 204 is controlled according to drive signals from the drive circuit 207 under the control of the CPU 210 and the servo circuit 206. A swing arm equipped with the magnetic head 205 can be moved in the direction of the radius of the hard disk 200A by this actuator 204.

The swing arm equipped with the magnetic head 205 is caused to seek to a target position on the hard disk 200A during accessing; when no access is made, it is positioned in a area out of the hard disk 200A, and is brought into so-called unload state.

In recording, information signals, such as AV data, accepted through the connection end 201 and the I/F circuit 202, are supplied to the RF circuit 203. The information signals are converted there into signals for recording, and then supplied to the magnetic head 205. As also mentioned above, the magnetic head 205 is positioned on a target track on the hard disk 200A by the actuator 204 that operates under the control of the CPU 210 and the servo circuit 206.

The magnetic head 205 applies a magnetic field to the target track on the hard disk 200A according to the signals for recording from the RF circuit 203. As a result, the signals for recording, that is, information signals, such as AV data, to be recorded are recorded on the hard disk 200A.

In reproduction, the magnetic head is positioned on a target track on the hard disk 200A by the actuator 204 that operates under the control of the CPU 210 and the servo circuit 206. The magnetic head 204 detects change in the magnetic field from the target track, and converts it into reproduction RF signals as electrical signals and supplies them to the RF circuit 203.

The RF circuit 203 generates reproduction signals from the reproduction RF signals from the magnetic head 205. Then, it supplies them to the information processing unit 100 of the recording and reproducing device in this embodiment through the I/F circuit 202 and the connection end 201. As a result, the reproduction signals can be utilized.

The HDD 200 in this embodiment is provided with several power consumption modes as, for example, HDDs for personal computers are. In the HDD 200 in this embodiment, six power consumption modes are implemented by the following method: as described below, the HDD 200 is divided into five circuit portions, and turn-on/off of power supplied to each circuit portion is controlled.

More specific description will be given. The HDD 200 in this embodiment is divided into five circuit portions: (1) I/F circuit portion comprising the I/F circuit 202, (2) spindle portion comprising the spindle motor 209 and the drive circuit 208 for rotationally driving the hard disk 200A, (3) actuator portion comprising the actuator 204 and the drive circuit 207 that control the swing arm equipped with the magnetic head 205, (4) servo circuit portion comprising the servo circuit 206, and (5) RF circuit portion that comprises the RF circuit 203 and constitutes a channel circuit portion for read/write.

As illustrated in FIG. 3, the HDD is provided with the following modes: Active mode in which data is being read and written and thus all the circuit portions, the I/F circuit portion (1), spindle portion (2), actuator portion (3), servo circuit portion (4), and RF circuit portion (5), are enabled; and Low Power Active mode (Performance Idle mode) in which only the RF circuit portion (5) is disabled.

Further, the HDD is provided with the following modes: Active Idle mode in which the RF circuit portion (5) and the servo circuit portion (4) are disabled; Low Power Idle mode in which the RF circuit portion (5), servo circuit portion (4), and actuator portion (3) are disabled; Standby mode in which the RF circuit portion (5), servo circuit portion (4), actuator portion (3), and spindle portion (2) are disabled; and Sleep mode in which the power consumption is reduced to the bare minimum level at which only the detection of acces to the HDD itself through the I/F circuit can be carried out. Thus, the HDD is provided with the six modes in total.

As illustrated as an example of power consumption at the right end of FIG. 3, Active mode, listed in the uppermost row, is the mode with the highest power consumption because data is read or written in this mode. The five circuit portions are turned off one by one as it goes toward the lowermost row. Sleep mode, listed in the lowermost row, is the mode with the lowest power consumption.

Therefore, the effect of power consumption reduction is more increased in the mode listed in the lower row in FIG. 3. However, the time it takes to return to Active mode (transition time) is accordingly lengthened. That is, the reduction of power consumption and quick return to Active mode are in the so-called trade-off relation.

Conventional HDDs used as auxiliary information storage devices for personal computers are usually ranked as items to be constructed separately from personal computers. For this reason, in conventional HDDs, the reduction of power consumption is accomplished without delay in operation by the following means: a HDD predicts the pattern of access from a personal computer for itself based on the history of access from the personal computer; and the HDD changes its power consumption mode. Thus, the personal computer need not take change of the power consumption mode of the HDD into account.

Meanwhile, the recording and reproducing device in this embodiment incorporates the HDD 200. With attention focused on the fact that the host CPU 120 of the information processing unit 100 grasps the timing with which access is made to the HDD 200, the following operation is performed: access to the HDD 200 and change of the power consumption mode are elaborately controlled on the information processing unit 100 side. Thus, further reduction of the power consumption is accomplished without hindering operation.

[Control on Power Consumption Mode Change]

Description will be given to control on change of the power consumption mode of the HDD 200, made in the recording and reproducing device in this embodiment, comprising the information processing unit 100 and the HDD 200 as information storing unit as mentioned above. In general, the transfer rates of HDDs tend to increase year by year. For example, some 3.5-inch HDDs have the performance with a transfer rate of over 200 Mbps. It is assumed that the transfer rate of the HDD 200 in this embodiment is also 200 Mbps.

The data rate for information signals (contents), such as AV data, to be recorded and reproduced is, for example, approximately 24 Mbps for high-definition signals in the MPEG (Moving Picture Experts Group) scheme, and approximately 10 Mbps for DVDs. These data rates are lower than the transfer rates of HDDs by an order of magnitude or so. It is assumed that the data transfer rate of the information processing unit 100 in this embodiment is also 10 Mbps.

For this reason, the power consumption can be reduced if the following measures are taken: data is stored to some degree in the buffer 105 of the information processing unit 100 as host system, and the HDD 200 is accessed in a short time, the HDD 200 is kept in a low-power consumption mode only for the time equivalent to the difference between the transfer rate of the HDD 200 and the data rate for information signals, such as AV data.

Description will be given with a concrete example taken. Consideration will be given to the following case: as mentioned above, the data rate for information-signals, such as AV data, is 10 Mbps; the transfer rate of the HDD 200 is 200 Mbps; and the storage capacity of the buffer 105 of the information processing unit 100 as host system is 10 Mbits.

In this case, the time for which data is stored in the buffer is determined as follows:

$$10 \text{ Mbit}/10 \text{ Mbps}=1 \text{ sec} \tag{1}$$

The time it takes to transfer data from the buffer to the HDD is determined as follow:

$$10 \text{ Mbit}/200 \text{ Mbps}=0.05 \text{ sec} \tag{2}$$

As is apparent from Expression (1) and Expression (2), the time for which the HDD 200 is accessed is only 0.05 seconds in one second. For the remaining 0.95 seconds, the mode may be caused to transition to a low-power consumption mode.

Such an accessing method that a HDD 200 is accessed only for part of the unit time and a low-power consumption mode is established for the remaining time is generally designated as intermittent access scheme. The recording and reproducing device in this embodiment also uses the intermittent access scheme utilizing the difference between the transfer rate (10 Mbps) of the information processing unit 100 for information signals, such as AV data, and the transfer rate (200 Mbps) of the HDD 200.

How efficiently the overall power consumption can be reduced depends on in how short transition time a low-power consumption mode can be established (transition to a low-power consumption mode can be made) when there is no access to the HDD 200.

FIG. 4A and FIG. 4B are drawings for explaining normal access and conventional intermittent access. FIG. 4A illustrates the way normal access is made, and FIG. 4B illustrates the way conventional intermittent access is made.

As illustrated in FIG. 4A, in normal access, data is uniformly transferred between a host system and an HDD 200 in the unit time. It is assumed that, as mentioned above, the data rate of the information processing unit 100 for information signals, such as AV data, is 10 Mbps; the transfer rate of the HDD 200 is 200 Mbps; and the power consumption in each power consumption mode is as shown at the right end of FIG. 3. In this case, the power consumption in normal access is approximately 1868 mW, as indicated by the expression boxed in FIG. 4A.

Meanwhile, in conventional intermittent access, the HDD 200 predicts the pattern of access from the host system for itself, and changes its power consumption mode, as illustrated in FIG. 4B. In this case, data is transferred in a lump; therefore, after data transfer, the power consumption mode can be lowered by two levels.

In this case, the following measures are taken in conventional intermittent access, as illustrated in FIG. 4B: after transfer of data equivalent to the unit data amount transferred per unit time is completed, the mode is caused to transition from Active mode to Low Power Active mode. To predict the pattern of access from the host system here, a transition time of, for example, 0.2 seconds is provided, and then the mode is caused to transition from Low Power Active mode to Active Idle mode. The power consumption in this conventional intermittent access is approximately 1193 mW, as indicated by the expression boxed in FIG. 4B, and the overall power consumption can be significantly reduced as compared with normal access.

However, the conventional intermittent access illustrated in FIG. 4B involves some waste. There is some time (0.2 seconds in the example illustrated in FIG. 4A and FIG. 4B) in Low Power Active mode before transition to Active Idle mode. Therefore, the power consumption (0.2 sec×1850 mW-0.2 sec×950 mW=180 mW) in Low Power Active mode for this period of 0.2 seconds is wasteful. The recording and reproducing device in this embodiment is so constructed that this wasteful power consumption can be reduced at least when data is transferred between the information processing unit 100 and the HDD 200.

FIG. 5 is a drawing for explaining intermittent access in the recording and reproducing device in this embodiment. The following case will be taken as an example: AV data obtained by shooting with the camera block 101 is recorded on the hard disk 200A in the HDD 200. The host CPU 120 grasps that, after transfer of data equivalent to the unit data amount (10 Mbits) to be transferred in unit time (one second) is completed, it takes 0.95 seconds for the unit data amount of data to be transferred next to be stored in the buffer 105. In the above case, therefore, the host CPU 120 sends out to the HDD 200 an instruction to immediately transition to Active Idle mode.

When the HDD 200 receives the instruction to immediately transition to Active mode from the information processing unit 100, it operates to immediately transition from Active mode to Active Idle mode, as illustrated in FIG. 5. It does not transition to Low Power Active mode.

In conventional intermittent access, the pattern of access from the host system is predicted on the HDD side; therefore, a relatively long transition time is taken. The above-mentioned constitution eliminates this relatively long transition time and accomplishes quick transition to a target power consumption mode, and thereby reduces the power consumption.

In this case, the mode transition time of 0.2 seconds illustrated in FIG. 4B is eliminated. Therefore, the power consumption is reduced to 1013 mW, as indicated by the expression boxed in FIG. 5, and the power consumption can be further reduced by 180 mW than in the conventional intermittent mode illustrated in FIG. 4B. As mentioned above, the power consumption mode of the HDD 200 is controlled from the information processing unit 100 as host system. The function of making this control possible is designated as DPM (Direct Power Management) function in this specification.

In this case, to which power consumption mode the present mode should be caused to transition is determined by the information processing unit 100 as host system. Therefore, for example, the following problem can be solved: access is made from the information processing unit 100; however, the mode has transitioned to a mode with needlessly low power consumption because of the operating state; therefore, it takes much time to transition to Active mode.

To make it possible to elaborately and appropriately control change of the power consumption mode from the information processing unit 100, as mentioned above, the following measures are taken: the information processing unit 100 is so constructed that it can detect the present power consumption mode of the HDD 200.

There is the possibility, though not great, that the host CPU 120 of the information processing unit 100 spends much time in, for example, control with respect to various circuit blocks; and it cannot send an instruction to change the power consumption mode out to the HDD 200 with proper timing. In consideration of this possibility, the power consumption mode with high power consumption is prevented from being maintained despite the absence of access from the information processing unit 100 by the taking the following measures: the maximum waiting time is set on the HDD 200 from the information processing unit 100 in case of transition from each power consumption mode to a mode with lower power consumption.

As mentioned above, the maximum waiting time is set from the information processing unit 100 in case of transition from each power consumption mode to a mode with lower power consumption. The function of utilizing this is designated as HCAPM (Host Controlled Advanced Power Management) function in this specification.

As also mentioned above, the recording and reproducing device in this embodiment is so constructed that the following is implemented: when an external digital device, such as a personal computer, is connected with the digital input/output terminal io based on the USB standard, the recording and reproducing device can be used also as an auxiliary information storage device for the external digital device. Therefore, the recording and reproducing device is so constructed that the following is implemented: the conventional APM function, wherein the pattern of access from an external digital device is predicted on the HDD 200 side and the HDD 200 changes its power consumption mode for itself, can also be used; and conventional intermittent access can also be made.

The conventional HDDs are provided with the Standby Timer function. This is for implementing the following: when there is no access for a predetermined time or longer in so-called Idle mode, the mode is caused to transition to Standby mode. The HDD 200 of the recording and reproducing device in this embodiment is also provided with the Standby Timer function.

The recording and reproducing device in this embodiment is so constructed that the host CPU 120 of its information processing unit 100 can give various instructions to the HDD 200. Such instructions include: instruction to select which to use, the DPM function or the APM function; instruction, given when the DPM function is used, which specifies to which power consumption mode the present mode should be changed; and the like.

In this case, the information processing unit 100 forms a command in a predetermined format at its host CPU 120, and supplies it to the HDD 200 through the media controller 106. The HDD 200 is so constructed that the following can be implemented: it accepts commands from the information processing unit 100 through the connection end 201 and the I/F circuit 202, and supplies them to the CPU 210; the CPU 210 of the HDD 200 performs processing according to commands from the information processing unit 100.

In the recording and reproducing device in this embodiment, the information processing unit 100 and the HDD 200 are connected with each other through an interface based on the ATA standard, for example. Description will be given to concrete examples in this case in which the above-mentioned functions are carried out. The details of commands that can be used in interfaces based on the ATA standard is announced at the web site at the URL of (http://www.t10.org/).

[Detailed Description of DPM (Direct Power-Management) Function]

Description will be given to the details of the DPM function. As mentioned above, the information processing unit 100 as host system has the best knowledge of the pattern of access to the HDD 200. Based on this fact, the DPM function is for accomplishing reduction of power consumption without depending on the estimation of the pattern of access from the information processing unit 100 by the HDD 200. The DPM function is such that the information processing unit 100 elaborately controls the power consumption mode of the HDD 200 for power consumption reduction.

More specific description will be given. The information processing unit 100 carries out various controls on the HDD 200. For example, it records data in the HDD 200, reads data from the HDD 200, supplies various commands, and refres to the values on the registers of the HDD. Based on the state of control of the information processing unit 100 on the HDD 200, the information processing unit 100 controls the power consumption mode of the HDD 200.

In the recording and reproducing device in this embodiment, the DPM function is disabled immediately after the power is turned on. When the DPM function is enabled by, for example, the extended Set Features command, the DPM commands become available. That is, immediately after the power is turned on, the conventional APM function is used in the HDD 200. When the information processing unit 100 instructs the HDD 200 to carry out the DPM function, using a predetermined command, the DPM function is enabled in the HDD 200.

[Instruction Command to Enable/Disable DPM Function]

Description will be given to commands for instructing the HDD 200 to enable/disable the DPM function. As also mentioned above, the information processing unit 100 and the HDD 200 are connected with each other using an interface based on the ATA standard. Therefore, the Set Features command laid down in the ATA standard is extended here, and enabling/disabling of the DPM is controlled by the SubCommand Code for the Features register under this extended Set Features command.

FIG. 6 is a drawing for explaining the format of the Set Features command, and FIG. 7 is a drawing for explaining the values settable on the Features register under the Set Features command and the meaning of them.

As illustrated in FIG. 6, the Set Features command is so constructed that target values are set in seven registers, each in eight bits (one byte), provided for the HDD 200; and various instructions are thereby given from the information processing unit 100 to the HDD 200.

The seven registers available in the HDD 200 when the Set Features command is used are as illustrated in FIG. 6. The registers include Features register, Sector Count register, Sector Number register, Cylinder Low register, Cylinder High register, Device/Head register, and Command register.

The Features register is loaded with information indicating the contents of instructions from the information processing unit 100 to the HDD 200. The Sector Count register, Sector Number register, Cylinder Low register, and Cylinder High register are used for setting, for example, a time limit and for other purposes.

In the Device/Head register, information that identifies a device to be used is set. More specific description will be given. The ATA standard lays down that two devices, master device and slave device, can be connected with one bus. In the Device/Head register, information indicating to which device the command should be directed is set.

In the recording and reproducing device in this embodiment, the information processing unit 100 is connected with only one HDD 200. Therefore, 0 (zero) is set in the device indication bit, the fourth bit from the MSB (Most Significant Bit) of the Device/Head register.

The Command register is for setting information indicating what command set the relevant command set is. In this case, "EFh" (h indicates hexadecimal notation), which is a value indicating that the relevant command set is the Set Features command, is set.

In this specification, "h" immediately following uppercase alphabetic characters A to F, such as the above-mentioned "EFh," and "h" immediately following numeric characters, such as "25h," indicate that the alphabetic or numeric characters immediately preceding them are represented in hexadecimal number.

As also mentioned above, whether to enable or disable the DPM function is instructed by the SubCommand Code in the Features register. The values that can be used as the SubCommand Code for the Features register are predetermined as illustrated in FIG. 7. As values that can be used as the SubCommand Code for the Features register, a value giving an instruction to enable the DPM function and a value giving an instruction to disable the DPM function are determined in advance.

In this example, as illustrated in FIG. 7, "25h" is taken as the value giving an instruction to enable the DPM function (Enable Direct Power Management), and "A5h" is taken as the value giving an instruction to disable the DPM function (Disable Direct Power Management).

As described later again, "26h" is newly defined as the value giving an instruction to use the HCAPM function (Set Host Controlled Advanced Power Management). As mentioned above, the HCAPM function is so constructed that it can be utilized in the recording and reproducing device in this embodiment.

In this embodiment, as mentioned above, the following values are additionally defined as values that can be utilized as the SubCommand Code for the Features register under the Set Features command: "25h" (Enable Direct Power Management), "A5h" (Disable Direct Power Management), and "26h" (Set Host Controlled Advanced Power Management).

To actually control enabling/disabling of the DPM function, as the Set Features command, appropriate values are set in the Features register, Device/Head register, and Command register. As a result, the HDD 200 can be set for enabling or disabling the DPM function.

FIG. 8A and FIG. 8B are drawings for explaining commands instructing to enable and disable the DPM function. FIG. 8A illustrates a command for enabling the DPM function, and FIG. 8B illustrates a command for disabling the DPM function.

More specific description will be given. As illustrated in FIG. 8A, to enable the DPM function in the HDD 200, the following command is supplied from the information processing unit 100 to the HDD 200: a command in which the value in the Features register is "25h"; the value in the Device/Head register is "A0h" as a predetermined value; and the value in the Command register is "EFh," the value indicating the Set Features command. When "25h", "A0h", and "EFh" in hexadecimal notation are represented in binary, they are "00100101", "10100000", and "11101111," respectively, as illustrated in FIG. 8A.

As illustrated in FIG. 8B, to disable the DPM function in the HDD 200, the following command is supplied from the information processing unit 100 to the HDD 200: a command in which the value in the Features register is "A5h"; the value in the Device/Head register is "A0h" as a predetermined value; and the value in the Command register is "EFh," the value indicating the Set Features command. When "A5h" in hexadecimal notation is represented in binary, it is "10100101" as illustrated in FIG. 8B.

Thus, the DPM function can be enabled or disabled in the HDD 200 by varying the value in the Features register using the Set Features command.

[Commands to Instruct Power Consumption Mode with DPM Function Enabled]

An instruction to change the power consumption mode is given from the information processing unit 100 to the HDD 200 as follows: the Idle Immediate command laid down in the ATA standard is extended, and the instruction is given by the value in the Features register under this extended Idle Immediate command.

FIG. 9 is a drawing for explaining the format of the Idle Immediate command, and FIG. 10 is a drawing for explaining the numeric values that can be set in the Features register under the Idle Immediate command and the meaning of them.

As illustrated in FIG. 9, the extended Idle Immediate command is also used, similarly with the above-mentioned extended Set Features command, as follows: target values are set in seven registers, each in eight bits (one byte), provided for the HDD 200; and various instructions are thereby given from the information processing unit 100 to the HDD 200.

The seven registers available in the HDD 200 when the Idle Immediate command is used are as illustrated in FIG. 9. The registers include Features register, Sector Count register, Sector Number register, Cylinder Low register, Cylinder High register, Device/Head register, and Command register. The functions of each register are the same as under the above-mentioned Set Features command.

To which power consumption mode the present mode should be caused to transition is instructed by the value in the Features register under the Idle Immediate command. The values to be set in the Features register under the Idle Immediate command are predetermined as illustrated in FIG. 10.

More specific description will be given. In this embodiment, as illustrated in FIG. 10, "00h" is taken as the value giving an instruction to immediately transition to Active mode (Active Immediate), and "01h" is taken as the value giving an instruction to immediately transition to Low Power Active mode (Low Power Active Immediate).

As further illustrated in FIG. 10, "02h" is taken as the value giving an instruction to immediately transition to Active Idle mode (Active Idle Immediate), and "03h" is taken as the value giving an instruction to immediately transition to Low Power Idle Immediate mode (Low Power Idle Immediate).

The information processing unit 100 sets any of the values "00h" to "03h," illustrated in FIG. 10, in the Features register under the Idle Immediate command. It can thereby cause the power consumption mode of the HDD 200 to immediately transition to a target power consumption mode.

Under the Idle Immediate command, "A0h" as a predetermined value is set in the Device/Head register as under the above-mentioned Set Features command, and "E1h" indicating the Idle Immediate command is set in the Command register.

FIG. 11A to FIG. 11D are drawings for explaining concrete examples of instruction commands for instructing to change the power consumption mode. FIG. 11A illustrates a command instructing immediate transition to Active mode (Active Immediate), and FIG. 11B illustrates a command instructing immediate transition to Low Power Active mode (Low Power Active Immediate).

FIG. 11C illustrates a command instructing immediate transition to Active Idle mode (Active Idle Immediate), and FIG. 11D illustrates a command instructing immediate transition to Low Power Idle Immediate mode (Low Power Idle Immediate).

Under any of the Idle Immediate commands illustrated in the FIG. 11A to FIG. 11D, the value in the Device/Head register is "A0h," a predetermined value, and the value in the Command register is "E1h" that indicates that the relevant command is the Idle Immediate command.

The value in the Features register that indicates to which power consumption mode the present mode should be caused to transition is any of "00h" to "03h" that are values indicating target power consumption modes, as illustrated in FIG. 11A to FIG. 11D.

As mentioned above, after the DPM function is enabled in the HDD 200 according to an instruction (by the Set Features command) from the information processing unit 100, the following operation can be performed: the HDD 200 can be caused to immediately transition to a target power consumption mode by an instruction by the Idle Immediate command from the information processing unit 100.

Therefore, after the unit data amount of data to be transferred in the unit time is sent out, as illustrated in FIG. 5, the following operation can be performed: the information processing unit 100 issues the Idle Immediate command illustrated in FIG. 1C, and the power consumption mode of the HDD 200 is thereby caused to immediately transition from Active mode to Active Idle mode.

The HDD 200 is so constructed that the following is implemented: when it receives the above-mentioned Idle Immediate command from the information processing unit 100, it quickly transitions to the specified power consumption mode. In addition, the HDD 200 is so constructed that, when the DPM function is disabled, the value in the Features register under the Idle Immediate command is disregarded.

[Command to Acquire Power Consumption Mode of HDD]

To elaborately control the power consumption mode of the HDD 200 from the information processing unit 100 by the above-mentioned DPM function, the information processing unit 100 must accurately grasp the state of the HDD 200.

Consequently, the recording and reproducing device in this embodiment is so constructed that the following is implemented: as conventionally practiced, the HDD 200 is caused to set the status of its power consumption mode in the Sector Count register by the Check Power Mode command, laid down in the ATA standard.

However, the Check Power Mode command is extended here so that the power consumption mode of the HDD 200 can be grasped in more detail. The information processing unit 100 is so constructed that the following is implemented: it refers to the value in the Sector Count register for the HDD 200 at the time of issuance of the Check Power Mode command, and it can thereby grasp the power consumption mode of the HDD 200 at that time.

FIG. 12A and FIG. 12B are drawings for explaining the format of the Check Power Mode command. The command illustrated in FIG. 12A is an input command from the information processing unit 100 as host system to the HDD 200; the command illustrated in FIG. 12B is an output command from the HDD 200 to the information processing unit 100.

As illustrated in FIG. 12A, the extended Check Power Mode command is also used, similarly with the above-mentioned extended Set Features command and extended Idle Immediate command, as follows: target values are set in seven registers, each in eight bits (one byte), provided for the HDD 200; and various instructions are thereby given from the information processing unit 100 to the HDD 200.

The seven registers available in the HDD 200 when the Check Power Mode command is used are as illustrated in FIG. 12A. The registers include Features register, Sector Count register, Sector Number register, Cylinder Low register, Cylinder High register, Device/Head register, and Command register. The functions of each register are the same as under the above-mentioned Set Features command and Idle Immediate command.

When the information processing unit 100 makes an attempt to grasp the present power consumption mode of the HDD 200, it issues the Check Power Mode command to the HDD 200. Under this command, "A0h," a predetermined value, is taken as the value in the Device/Head register, as under the Set Features command or Idle Immediate command; and "E5h" that is the value indicating the Check Power Mode command is taken as the value in the Command register.

When the HDD 200 accepts the Check Power Mode command from the information processing unit 100, it sets a value indicating its power consumption mode in a register for Check Power Mode command output, as illustrate in FIG. 12B. Thus, the information processing unit 100 can refer to it.

More specific description will be given. As illustrated in FIG. 12B, the registers for Check Power Mode command output include: Error register, Sector Count register, Sector Number register, Cylinder Low register, Cylinder High register, Device/Head register, and Status register. The value indicating the power consumption mode is set in the Sector Count register of these registers.

FIG. 13A and FIG. 13B are drawings for explaining examples of values set in the Sector Count register for Check Power Mode command output in order to provide a notification of the power consumption mode of the HDD 200. FIG. 13A illustrates the values used to provide a notification of the power consumption mode when the DPM function is disabled. FIG. 13B illustrates the values used to provide a more detailed notification of the power consumption mode when the DPM function is enabled.

When the conventional APM function is used, control to change the power consumption mode is carried out on the HDD 200 side. Therefore, the information processing unit 100 only has to be roughly notified of the power consumption mode. For this reason, when the DPM function is disabled and the APM function is used, such a constitution that three statuses can be notified, as illustrated in FIG. 13A, is adopted. The three statuses are Standby mode indicated by "00h," Idle mode indicated by "80h," and Active mode or Idle mode indicated by "FFh."

In this case, Idle mode is a generic name for three modes, Low Power Active mode, also referred to as Performance Idle, Active Idle mode, and Low Power Idle mode, as illustrated in FIG. 3. When the power consumption mode is any of these three modes, that mode is classified under Idle mode.

Meanwhile, when the DPM function is enabled, the state must be grasped in more detail. Therefore, (1) "FFh" is taken for Active mode, (2) "83h" is taken for Low Power Active mode, (3) "82h" is taken for Active Idle mode, (4) "81h" is taken for Low Power Idle mode, and (5) "00h" is taken for Standby mode, as illustrated in FIG. 13B. Thus, of the six modes illustrated in FIG. 3, all the power consumption mode, other than Sleep mode in which only the bare minimum power is supplied, can be notified of.

As mentioned above, when the DPM function is enabled, the power consumption mode of the HDD 200 can be grasped in detail, unlike the cases where the APM function is used. In these cases, the power consumption mode is roughly grasped, as illustrated in FIG. 13A. When DPM function is enabled, mode changes can be elaborately instructed, for example, between Low Power Active mode and Active Idle mode and between Active Idle mode and Low Power Idle mode.

[HCAPM Function]

As mentioned above, when the DPM function is enabled, the HDD 200 is caused to follow instructions from the information processing unit 100 as host system; the HDD 200 is prevented from changing its power consumption mode for itself. However, even if power consumption control is carried out with the DPM function enabled, as also mentioned above, problems can arise due to some trouble in the information processing unit 100. For example, the information processing unit may not be capable of controlling the power consumption mode of the HDD 200, or it may take much time to control the power consumption mode.

In this case, the power consumption cannot be reliably reduced if the HDD 200 does not change its power consumption mode until some instruction is given from the information processing unit 100. The HCAPM function is used to cope with this. The HCAPM function is such that: a maximum value (maximum time) is preset on the HDD 200 from the information processing unit 100; this maximum value indicates how long the HDD should wait for access from the information processing unit 100 before it can transition to another power consumption mode; based on this maximum value, the HDD 200 changes its power consumption mode for itself. The recording and reproducing device in this embodiment uses a conventional Standby Timer together.

As mentioned above, the HCAPM function is a function that can be enabled only when the DPM function is enabled, and it can be said that the HCAPM function complements the DPM function. More specific description will be given. As described with reference to FIG. 6, FIG. 7, and FIG. 8A, the HCAPM function is carried out as follows: only when the DPM function is enabled by the extended Set Features command, it is enabled in synchronization therewith. It is not used together with the conventional APM function.

The HCAPM function is used as follows: when the HDD 200 is in Active mode as illustrated in FIG. 14, for example, the transition time T1 from Active mode to Low Power Active mode is preset on the HDD 200 from the information processing unit 100. The transition time T1 is used as a criterion for determining how long the HDD 200 should waits for access from the information processing unit 100 before it can transition to Low Power Active mode for itself.

Similarly, the transition time T2 from Low Power Active mode to Active Idle mode is preset on the HDD 200 from the information processing unit 100. The transition time T2 is used as a criterion for determining how long the HDD 200 in Low Power Active mode should wait for access from the information processing unit 100 before it can transition to Active Idle mode for itself.

Similarly, the transition time T3 from Active Idle mode to Low Power Idle mode is preset on the HDD 200 from the information processing unit 100. The transition time T3 is used as a criterion for determining how long the HDD 200 in Active Idle mode should wait for access from the information processing unit 100 before it can transition to Low Power Idle mode for itself.

Similarly, the transition time T4 from Low Power Idle mode to Standby mode is preset on the HDD 200 from the information processing unit 100. The transition time T4 is used as a criterion for determining how long the HDD 200 in Low Power Idle mode should wait for access from the information processing unit 100 before it can transition to Standby mode for itself.

FIG. 14 illustrates the foregoing. As illustrated in the drawing, the transition times T1, T2, T3, and T4 are used as criteria for determining when each power consumption mode should be caused to transition to the one-step lower power consumption mode. These transition times are supplied in advance from the information processing unit 100 to the HDD 200, and set on, for example, the timer circuit 213. The HDD 200 is prevented from varying these settings of transition time.

In the example illustrated in FIG. 14, the transition times T1, T2, T3, and T4 are substantially identical in length; however, the present invention is not limited to this. As described later again, the transition times T1, T2, T3, and T4 may be made different from one another, needless to add.

When the DPM function is enabled, the power consumption control is carried out by the DPM function. As mentioned above, a value obtained by adding a little something extra to the transition time intervals in the DPM function is preset on the HDD 200 by the HCAPM function. Thus, increase in power consumption can be avoided if the information processing unit 100 cannot control the power consumption mode of the HDD 200 or it takes much time to control it. This is accomplished by the following operation: with reference to the above-mentioned transition times T1, T2, T3, and T4, the CPU 210 of the HDD 200 causes the HDD to change its power consumption mode for itself, in cooperation with the timer circuit 213.

As mentioned above, the transition times T1, T2, T3, and T4 from each power consumption mode to the one-step lower power consumption mode are preset on the HDD 200 as a drive from the information processing unit 100 as host system. The setting of these transition times is made by defining the SubCommand Code for the Features register under the extended Set Features command and the SubCommand Code Specific for the Sector Count register and the Sector Number register.

FIG. 15, FIG. 16, and FIG. 17 are drawings for explaining the extended Set Features command used when the transition times T1, T2, T3, and T4 are set for transition from each power consumption mode to the one-step lower power consumption mode.

FIG. 15 is a drawing for explaining the extended Set Features command used when the transition times T1, T2, T3, and T4 are set for transition from each power consumption mode to the one-step lower power consumption mode. In FIG. 15, the details of the Device/Head register and the Command register are the same as those of the extended Set Features command used to instruct to enable/disable the DPM function, described with reference to FIG. 6. That is, a value "10100000" (A0h) is set in the Device/Head register, and a value "11101111" (EFh) that indicates the Set Features command is set in the Command register.

A value "26h," which indicates an instruction to set the transition time used in the HCAPM function, is set in the Features register, as illustrated in FIG. 7. Information indicating the transition from what power consumption mode to what power consumption mode the setting of the transition time is for is set in the Sector Count register. The recording and reproducing device in this embodiment is so constructed that which transition time the setting is for can be specified by "00h," "01h," "02h," or "03h," as illustrated in FIG. 16.

The actual setting of transition time is made using the SubCommand Code Specific for the Sector Number register. The Sector Number register is also an eight-bit register. In this embodiment, therefore, times from 0 msec to 10000 msec are represented in 256 steps that can be represented using eight bits.

For this reason, the time per step is approximately 40 msec, and in the HDD 200, the actual transition time instructed can be obtained by multiplying the value in the Sector Number register by 40 msec. A concrete example will be taken. When 3 sec is specified for transition time, the value in the Sector Number register is 75 steps, "01001011" when represented in binary and "4Bh" when represented in hexadecimal. Thus, 75 steps×40 msec=3000 msec=3 sec.

Thus, the following advantage is brought by using the HCAPM function: even if with the DPM function enabled, the information processing unit 100 cannot issue an instruction to change the power consumption mode to the HDD 200 for some reason, increase in power consumption will not result.

As also mentioned above, the recording and reproducing device in this embodiment uses the Standby Timer function as well. Therefore, even if the HCAPM function cannot be enabled for some reason, the Standby Timer function is available, and increase in power consumption can be suppressed.

As mentioned above, the recording and reproducing device in this embodiment is provided with the DPM function and the HCAPM function in addition to the APM function and the Standby Timer function that are conventionally used in power consumption control. The recording and reproducing device is so constructed that the information processing unit 100 can grasp in detail in what power consumption mode the HDD 200 is. As a result, the information processing unit 100 can elaborately control the power consumption mode of the HDD 200, and efficiently reduce the power consumption.

FIG. 18 is a list of the power consumption control functions used in the recording and reproducing device in this embodiment. The Standby Timer function and the APM (Advanced Power Management) function, indicated in the diagonally shaded areas in FIG. 18, are functions conventionally provided in HDDs for personal computers. The DPM (Direct Power Management) function and the HCAPM (Host Controlled Advanced Power Management) function are extended according to the present invention.

As shown in the upper half of FIG. 18, except the item names, the recording and reproducing device in this embodiment is so constructed that, when the DPM function is disabled, the Standby Timer function and/or the APM function can be set to enabled or disabled.

The Standby Timer function is disabled by default, but it can be enabled regardless of the DPM function by setting it again. The APM function is enabled by default, but it can be disabled by setting it again. When the APM function is disabled, the minimum power consumption control is carried out; therefore, the APM function of so-called mode zero is carried out. When the APM function is enabled, the DPM function and the HCAPM function are prevented from being used together.

As shown in the lower half of FIG. 18, except the item names, the recording and reproducing device in this embodiment is so constructed that, when the DPM function is enabled, the Standby Timer function can be set to enabled or disabled; however, the APM function is invariably disabled. As mentioned above, when the DPM function is enabled, the HCAPM function is also enabled in synchronization therewith. In addition, the Standby Timer function can be used together.

Next, description will be given to power consumption control in the recording and reproducing device in this embodiment with reference to the flowchart in FIG. 19. As also mentioned above, the recording and reproducing device in this embodiment is provided with the conventional APM function and the DPM function. When these functions are simultaneously used, proper power consumption control is infeasible. Therefore, it is so constructed that the APM function and the newly provided DPM function can be alternatively used.

The conventional Standby Timer function can be used together both with the APM function and with the DPM function. When the DPM function is used, the HCAPM function can also be used. Basically, the APM function and the DPM function are alternated as illustrated in the flowchart in FIG. 19.

Figure 19:
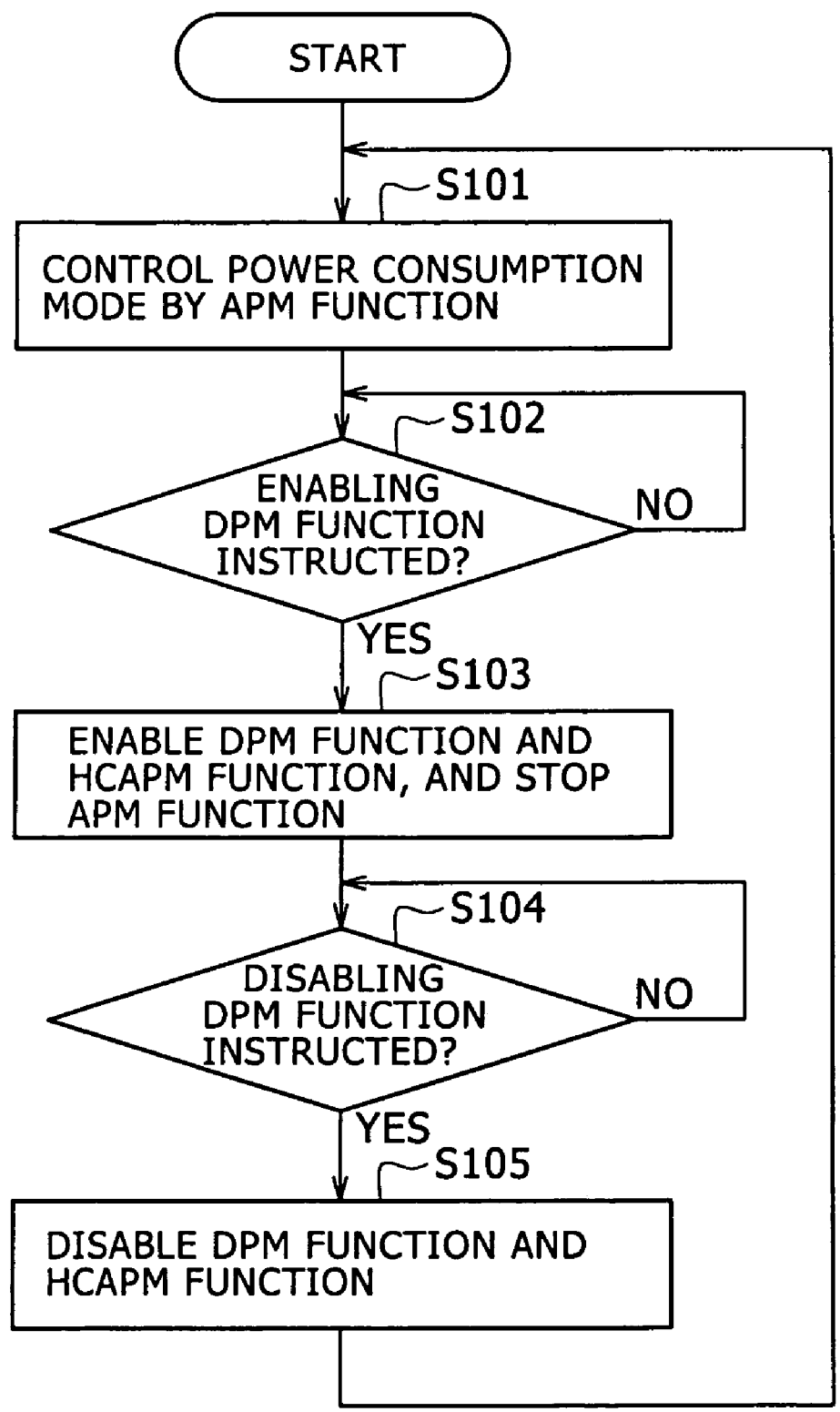
FIG. 19 is a flowchart explaining switching control for the APM function and the DPM function, carried out in the recording and reproducing device illustrated in FIG. 1.

FIG. 19 is a flowchart for explaining the power consumption control carried out when the power is turned on to the recording and reproducing device in this embodiment. When the power is turned on to the recording and reproducing device in this embodiment, the HDD 200 enables the APM function first so that power consumption control is carried out by the APM function (Step S101).

It is determined whether a command to enable the DPM function has been issued from the information processing unit 100 (Step S102). The HDD 200 performs the following operation until a command enabling the DPM function is issued from the information processing unit 100: by the conventional APM function, the HDD 200 estimates the pattern of access from the information processing unit 100 and changes its power consumption mode for itself.

When the judgment at Step S102 reveals that a command enabling the DPM function has been issued from the information processing unit 100, the HDD 200 enables the DPM function and the HCAPM function, and prevents the APM function from being carried out (Step S103).

Then, it is determined whether a command disabling the DPM function has been issued from the information processing unit 100 (Step S104). The HDD 200 carries out the following power consumption control until a command disabling the DPM function is issued from the information processing unit 100: by the newly provided DPM function, the HDD changes its power consumption mode according to the extended Set Features command from the information processing unit 100.

When the DPM function is enabled, the HCAPM function is also enabled. Thus, the following operation can be performed if a command to change the power consumption mode, which should be otherwise issued from the information processing unit 100, is not issued for some reason and there is no access from the information processing unit 100 for a predetermined period of time: the HDD 200 transitions to a power consumption mode with lower power consumption using its own judgment.

If the judgment at Step S104 reveals that a command disabling the DPM function has been issued from the information processing unit 100, the HDD 200 disables the DPM function and the HCAPM function (Step S105), and repeats the processing of Step S101 and the following steps.

As also mentioned above, the Standby Timer function can be used together with the conventional APM function and with the new DPM function. Therefore, the recording and reproducing device in this embodiment is so constructed that the Standby Timer function can be used together with the APM function or the DPM function according to the user's instruction.

Next, description will be given to the operation performed in the recording and reproducing device in this embodiment when the information processing unit 100 grasps the state of the power consumption mode of the HDD 200. This processing is not processing in which the information processing unit 100 only issues a command to the HDD 200, for example, an instruction to enable/disable the DPM function, and the setting of transition time for the HCAPM function.

The above-mentioned processing is so constructed that, when the information processing unit 100 grasps the state of the power consumption mode of the HDD 200, that is accomplished as described below: the HDD 200 grasps the state of its own power consumption for itself, and the information processing unit 100 refers to it.

Figure 20:
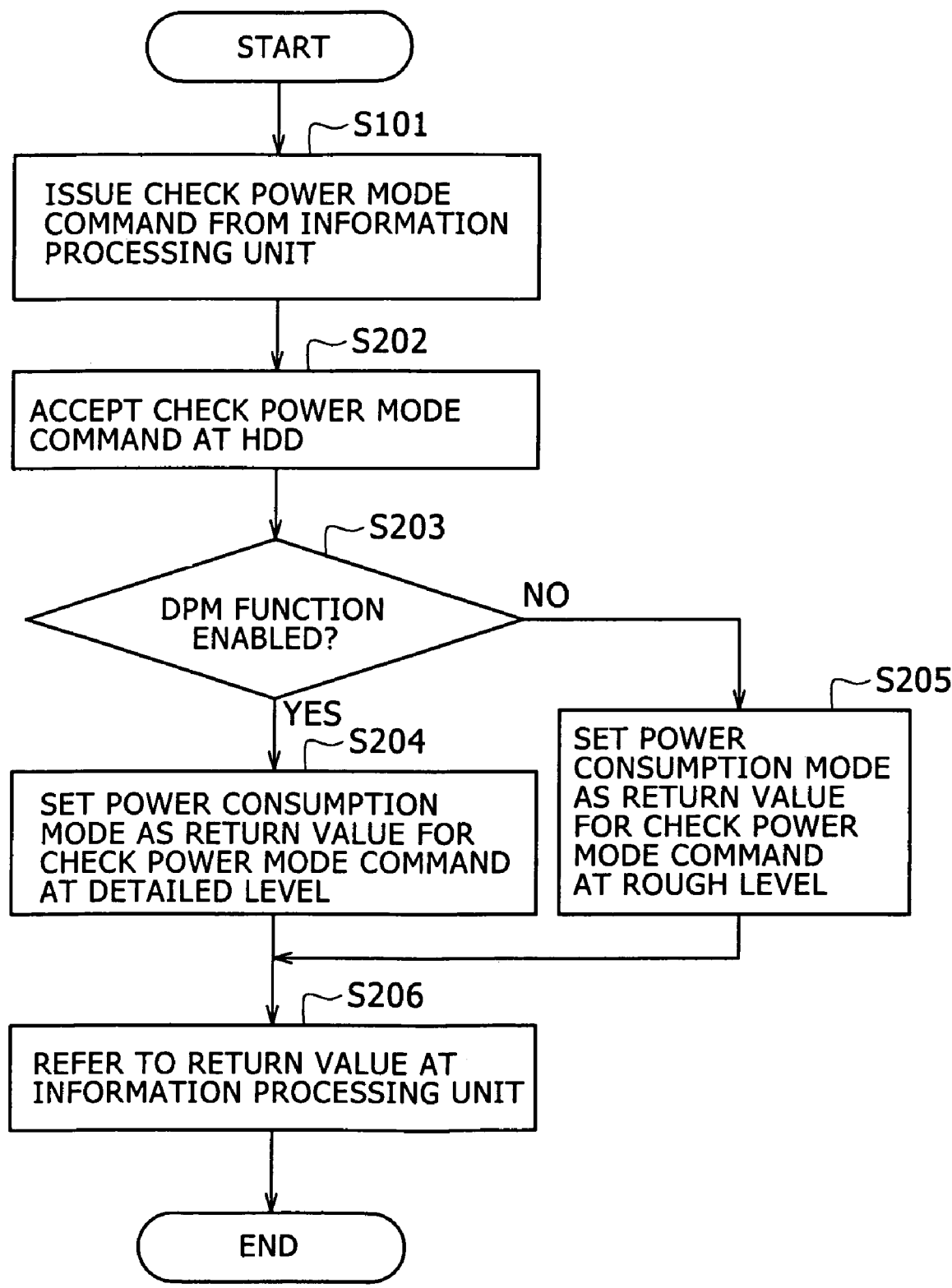
FIG. 20 is a drawing explaining the processing of detecting the power consumption mode of the HDD, performed in the recording and reproducing device illustrated in FIG. 1.

FIG. 20 is a flowchart for explaining the operation performed when the information processing unit 100 grasps the state of the power consumption mode of the HDD 200. There are cases where the host CPU 120 of the information processing unit 100 desires to grasp the present power consumption mode of the HDD 200 before issuing, for example, a command to change the power consumption mode.

In such a case, the host CPU 120 of the information processing unit 100 performs the processing illustrated in FIG. 20. First, it issues the Check Power Mode command (Step S201). The Check Power Mode command from the information processing unit 100 is accepted by the HDD 200 (Step S202). When the HDD 200 accepts the Check Power Mode command from the information processing unit 100, the CPU 210 of the HDD 200 determines whether the DPM function is presently enabled (Step S203).

In other words, this judgment at Step S203 is processing to determine which function is enabled, the DPM function or the APM function. If the judgment at Step S203 reveals that the DPM function has been enabled, the HDD 200 performs the following operation: it takes as a return value such a value that information indicating the present power consumption mode can be imparted at such a detailed level as illustrated in FIG. 13B. Then, the HDD sets this return value in the Sector Count register under the Check Power Mode (Step S204).

If the judgment at Step S203 reveals that the DPM function is disabled and the APM function is enabled, the HDD 200 performs the following operation: it takes a return value such a value that information indicating the present power consumption mode can be imparted at such a rough level as illustrated in FIG. 13A. Then, the HDD sets this return value in the Sector Count register under the Check Power Mode (Step S205).

The information processing unit 100 refers to the return value in the Sector Count register of the HDD 200. As a result, it can grasp the present power consumption mode of the HDD 200 at the level corresponding to the presently enabled power consumption control function (Step S206).

Thus, the recording and reproducing device in this embodiment is so constructed that the following operation is performed: the host CPU 120 of the information processing unit 100 forms various commands, for example, a command to change the power consumption mode of the HDD 200, according to the state of its own access to (control on) the HDD 200. It supplies these commands to the HDD 200 through the media controller 106.

Further, the recording and reproducing device is so constructed that the following operation is performed: the HDD 200 accepts commands through the connection end 201 and the I/F circuit 202, and supplies the accepted commands to the CPU 210; the CPU 210 of the HDD 200 performs the following operations according to the accepted commands: controlling the power supplied to each part; grasping the power consumption mode of the HDD itself, and imparting it to the information processing unit 100; and detecting the timing with which the power consumption mode should be changed, to change the power consumption mode in cooperation with the timer circuit 213.

As mentioned above, the recording and reproducing device in this embodiment is so constructed that the information processing unit 100 itself elaborately controls the power consumption of the HDD 200 based on the state of its own access to (the state of control on) the HDD 200; and the power consumption can be thereby reduced.

In the embodiment described above as an example, the recording and reproducing device comprises the information processing unit 100 and the HDD 200. However, the information storing unit need not be a HDD, and it may be a drive for various disk recording media, including optical disks such as DVDs and magneto-optical disks such as MDs.

The information processing unit 100 and the information storing unit 200 such as a HDD need not exist in the same enclosure. The present invention is applicable to cases where they are formed separately from each other and connected with each other thorough a predetermined interface cable.

However, in mobile devices such as the above-mentioned digital video cameras in which the information processing unit 100 and the information storing unit 200 are housed in one enclosure, the present invention can be effectively utilized. This is because the power consumption can be more efficiently reduced, and this brings about various effects, including lengthened battery duration and suppression of temperature rise in the enclosure.

In the embodiment described above as an example, the information processing unit 100 and the information storing unit 200 are connected with each other through an interface based on the ATA standard. The present invention is not limited to this, and various interfaces can be used as the interface that connects the information processing unit and the information storing unit such as a HDD.

In such a case, therefore, commands corresponding to the various commands described with the case where an interface based on the ATA standard is used taken as an example are formed in correspondence with the interface used.

In the above-mentioned example, the embodiment is a recording and reproducing device. The present invention is not limited to this, and is applicable to various types of recording devices and reproducing devices. That is, the present invention is applicable to cases where information signals are read from a recording medium in a drive such as a HDD and reproduced as well as cases where information signals such as AV data are recorded. In such cases as well, the information processing unit can control the power consumption mode of the drive based on the state of its own access to the drive.

In the embodiment described above, the conventional APM function and the DPM function according to the present invention are alternatively used. In this case, when the DPM function is enabled, the HCAPM function is also enabled. However, even if the DPM function is used, the HCAPM function may be kept unused.

Therefore, in addition to alternative use of the APM function and the DPM function, the Standby Timer function may be used together, or the HCAPM function may be switched between enabled state and disabled state.

That is, either or both of the DPM function and HCAPM function according to the present invention can be selectively used together with either or both of the conventional APM function and Standby Timer function. Or, only the DPM function or only the DPM function and the HCAPM function can be used without use of the APM function or the Standby Timer function.

The recording and reproducing device in the above-mentioned embodiment is so constructed that the following takes place: for example, when normal mode is established and an external device is connected with the digital input/output terminal io, power can be supplied from the external device. Therefore, the APM function is used; even if shooting mode or normal mode is established, the DPM function can be used with no external device connected with the digital input/output terminal io. Needless to add, this is just an example. Cases where only the APM function can be used and cases where the DPM function can be used may be defined.

In the recording and reproducing device in the above-mentioned embodiment, the intermittent access scheme is used. Thus, reduction of power consumption can be accomplished and further temperature rise in the enclosure can be suppressed. In addition, the following spillover effect is brought about: since the time for which the information storing unit (storage device portion) such as a HDD is being accessed is short, the probability of occurrence of glitches due to shock such as disturbance is accordingly lowered.

According to the present invention, as mentioned above, the power consumption of disk drives such as HDDs and DVD drives can be efficiently and reliably reduced. In case of mobile devices or the like, the battery duration can be lengthened, and further the temperature in the enclosure and the like can be prevented from unnecessarily rising.

The invention claimed is:

1. Information processing equipment comprising:
    an information storing means that records or reproduces data according to a plurality of power consumption modes; and
    an information processing means that controls the information storing means with respect to at least recording or reproduction of the data;
    wherein the information processing means forms command information for changing the power consumption mode of the information storing means to a target power consumption mode based on a state of control, and the information storing means changes the power consumption mode of the information storing means based on the command information;
    wherein the information processing means forms instruction information for instructing whether to change the power consumption mode, and when change of the power consumption mode is not instructed by the instruction information, the information storing means makes a selection and changes the power consumption mode based on the state of control from the information processing means.

2. The information processing equipment according to claim 1, wherein when the information storing means is not controlled by the information processing means for a predetermined time, the information processing means forms time information including the predetermined time for the information storing means to change the power consumption mode for itself, and when the power consumption mode is to be changed based on the command information from the information processing means and the information processing means does not carry out control for the predetermined time or more, specified by the time information, the information storing means changes the power consumption mode for itself.

3. The information processing equipment according to claim 1, further comprising:
    a camera means that picks up the image of a subject and takes in the image as electrical signals,
    wherein when an image is picked up with the camera means, the information storing means changes the power consumption mode of the information storing means based on the command information.

4. The information processing equipment according to claim 1, further comprising:
    an external connection end for an external device to record or reproduce data to or from the information storing means,
    wherein when the external device is recording or reproducing the data to or from the storing means through the external connection end, the information storing means changes the power consumption mode based on the state of control from an external device connected with the external connection end with respect to at least recording or reproducing of the data.

5. A power consumption control method associated with an information storing means, carried out in information processing equipment comprising an information storing means that records or reproduces data according to a plurality of power consumption modes and an information processing means that controls the information storing means with respect to at least recording or reproducing of the data, the method comprising:
    a step in which the information processing means produces command information for changing the power consumption mode of the information storing means to a target power consumption mode based on a state of control;
    a step in which the information storing means changes the power consumption mode of the information storing means based on the command information;
    a step in which the information processing means forms instruction information for instructing whether to change the power consumption mode; and
    a step in which when change of the power consumption mode is not instructed by the instruction information, the information storing means makes a selection and changes the power consumption mode based on the state of control from the information processing means.

6. The power consumption control method according to claim 5, further comprising:
    a step in which when the information storing means is not controlled by the information processing means for a predetermined time, the information processing means forms time information including the predetermined time for the information storing means to change the power consumption mode for itself, and
    a step in which when the power consumption mode is to be changed based on the command information from the information processing means and the information processing means does not carry out control for the predetermined time or more, specified by the time information, the information storing means changes the power consumption mode for itself.

7. The power consumption control method according to claim 5, wherein the information processing equipment further comprises a camera means that picks up the image of a subject and takes in the image as electrical signals,
    wherein when an image is picked up with the camera means, the information storing means changes the power consumption mode of the information storing means based on the command information.

8. The power consumption control method according to claim 5, wherein the information processing equipment further comprises an external connection end for an external device to record or reproduce data to or from the information storing means,
  wherein when the external device is recording or reproducing the data to or from the storing means through the external connection end, the information storing means changes the power consumption mode based on the state of control from an external device connected with the external connection end with respect to at least recording or reproducing of the data.

* * * * *